(12) United States Patent
Galland et al.

(10) Patent No.: US 7,819,279 B2
(45) Date of Patent: Oct. 26, 2010

(54) LATCHABLE CONTAINER SYSTEM

(75) Inventors: Roderick E. Galland, Lead, SD (US); Hossein Monajjem, Fort Collins, CO (US)

(73) Assignee: International Molded Packaging Corporation, Central City, SD (US)

( * ) Notice: Subject to any disclaimer, the term of this patent is extended or adjusted under 35 U.S.C. 154(b) by 744 days.

(21) Appl. No.: 11/588,673

(22) Filed: Oct. 27, 2006

(65) Prior Publication Data

US 2007/0095848 A1    May 3, 2007

(51) Int. Cl.
*B65D 43/10* (2006.01)
*B65D 6/28* (2006.01)
*B65D 43/16* (2006.01)

(52) U.S. Cl. ............... 220/784; 220/4.21; 220/4.23; 220/835; 220/839; 220/266; 206/1.5; 206/469; 206/470

(58) Field of Classification Search ....... 220/4.21–4.24, 220/266, 268, 780, 783, 784, 786, 788, 835, 220/839; 206/1.5, 469, 470, 800, 807; 383/5, 383/61.2, 63
See application file for complete search history.

(56) References Cited

U.S. PATENT DOCUMENTS

| | | |
|---|---|---|
| 1,509,829 A | 9/1924 | Doty |
| 1,513,395 A | 10/1924 | Holmes |
| 1,608,112 A | 11/1926 | Muethel |
| 1,817,852 A | 8/1931 | Sloan |
| 2,520,467 A | 8/1950 | Merralls |
| 2,587,033 A | 2/1952 | Dobbs et al. |
| 2,695,646 A | 11/1954 | Van Wyk |
| RE24,166 E | 6/1956 | Stiller |
| 2,913,161 A | 11/1959 | Travis |
| 3,063,487 A | 11/1962 | Mullin |
| 3,110,335 A | 11/1963 | Antonius |
| 3,124,293 A | 3/1964 | Transport |
| 3,160,186 A | 12/1964 | Conley |
| 3,176,743 A | 4/1965 | Bundy |
| 3,280,870 A | 10/1966 | Bundy |
| D208,273 S | 8/1967 | Bundy |
| 3,395,788 A | 8/1968 | Gill |
| 3,426,814 A | 2/1969 | Bundy |
| 3,473,648 A | 10/1969 | Paluzzi |
| 3,565,146 A | 2/1971 | Arnolds |
| 3,578,115 A | 5/1971 | Schneider |
| 3,786,982 A | 1/1974 | Rakes et al. |

(Continued)

FOREIGN PATENT DOCUMENTS

ES    1046318    5/2000

*Primary Examiner*—Nathan J Newhouse
*Assistant Examiner*—James N Smalley
(74) *Attorney, Agent, or Firm*—Jean Kyle

(57) ABSTRACT

A latching system including both apparatus and methods addresses the need for a reusable latch that is identical on either side of a container opening, thereby facilitating container manufacture. Also disclosed are apparatus and methods for assuring the quality of latch able container enclosed contents and enhancing the safety of container users by providing an unopened condition assurance element such as a tab that is removable from a reusable container latch. A novel latching system with a split insertion clement on a first latch side and unitary receptor element on a second latch side is also disclosed. A preferred embodiment involves an elastically obstructed latch as used on a squeeze-openable container.

10 Claims, 41 Drawing Sheets

U.S. PATENT DOCUMENTS

| | | | |
|---|---|---|---|
| 3,918,503 A | 11/1975 | Bundy | |
| 4,006,764 A | 2/1977 | Yamamoto et al. | |
| 4,037,720 A | 7/1977 | McGurk | |
| 4,109,790 A | 8/1978 | Gottschlich | |
| 4,166,489 A | 9/1979 | Lemelson | |
| 4,194,655 A | 3/1980 | Tillotson | |
| 4,515,210 A | 5/1985 | Smith et al. | |
| 4,576,330 A | 3/1986 | Schepp | |
| 4,681,223 A | 7/1987 | Roberts | |
| 4,710,968 A | 12/1987 | Borchardt et al. | |
| 4,733,778 A | 3/1988 | Boeckmann et al. | |
| 4,741,434 A | 5/1988 | Liebman | |
| 4,896,775 A | 1/1990 | Boeckmann et al. | |
| 4,907,694 A | 3/1990 | Miller et al. | |
| 4,940,136 A | 7/1990 | Miller et al. | |
| 5,044,774 A | 9/1991 | Bullard et al. | |
| 5,046,659 A | 9/1991 | Warburton | |
| 5,076,460 A | 12/1991 | Hussell | |
| 5,129,734 A | 7/1992 | Van Erden | |
| 5,174,658 A | 12/1992 | Cook et al. | |
| 5,226,543 A | 7/1993 | Foos et al. | |
| 5,385,232 A | 1/1995 | Foos et al. | |
| 5,443,154 A | 8/1995 | Hustad et al. | |
| 5,472,281 A | 12/1995 | Phelps | |
| 5,542,766 A | 8/1996 | Cadwallader | |
| 5,584,408 A | 12/1996 | Orkisz | |
| 5,620,089 A | 4/1997 | Mills | |
| 5,623,980 A | 4/1997 | McMahon | |
| 5,651,462 A | 7/1997 | Simonsen et al. | |
| 5,788,105 A | 8/1998 | Foos | |
| 5,799,796 A | 9/1998 | Azelton et al. | |
| 5,884,513 A | 3/1999 | Norris | |
| 5,899,334 A | 5/1999 | Domerchie et al. | |
| 6,200,028 B1 | 3/2001 | Buchanan | |
| 6,227,369 B1 * | 5/2001 | Glassman | 206/469 |
| 6,244,430 B1 | 6/2001 | Travis | |
| 6,318,548 B1 | 11/2001 | Travis | |
| 6,353,215 B1 | 3/2002 | Revels et al. | |
| 6,679,381 B1 | 1/2004 | Bush | |

* cited by examiner

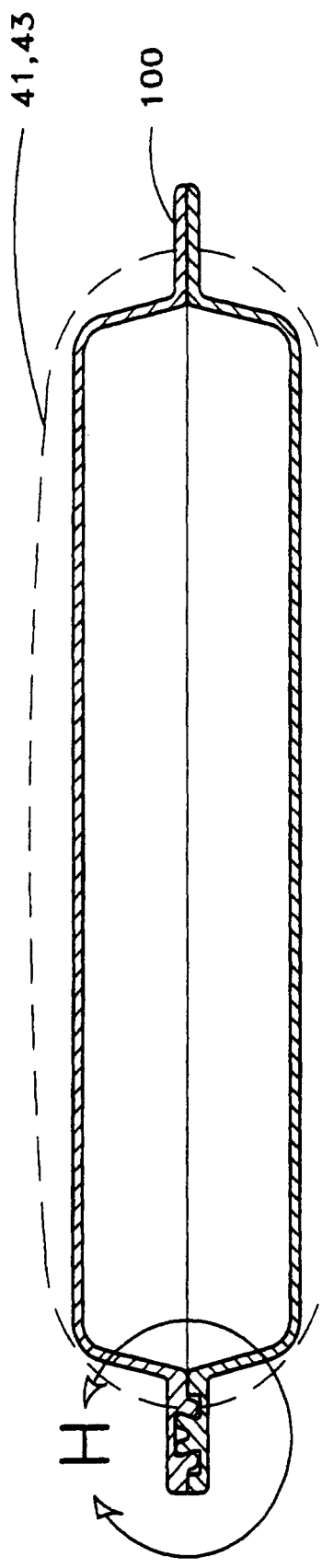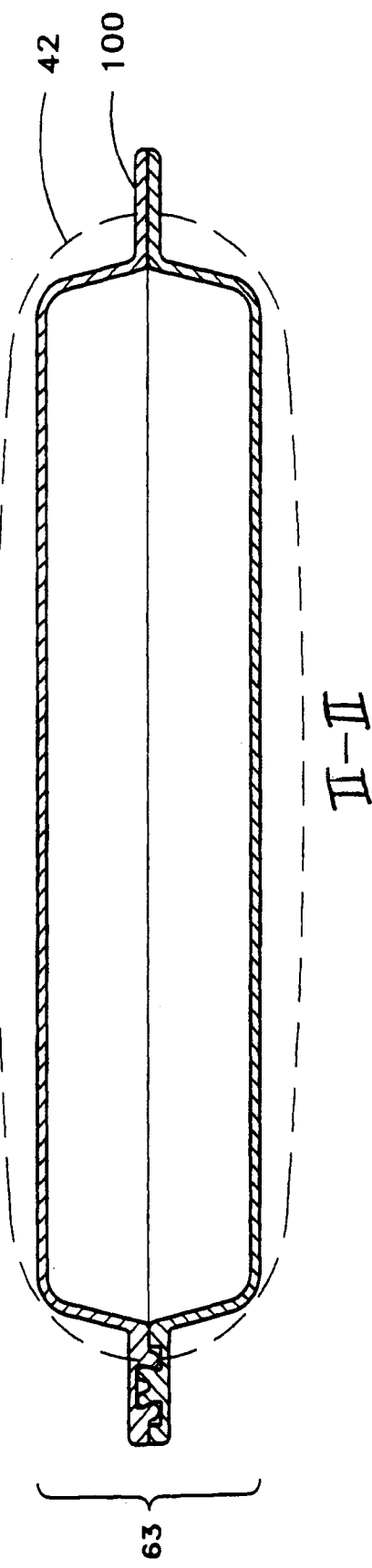
Fig. 5A I-I
Fig. 5B II-II

I-I

II-II

63

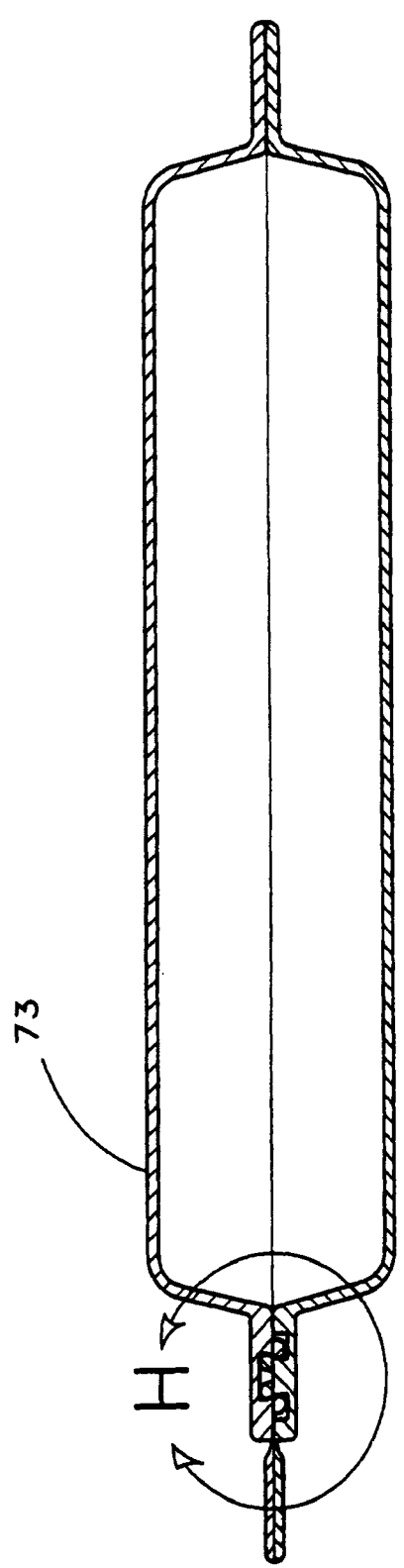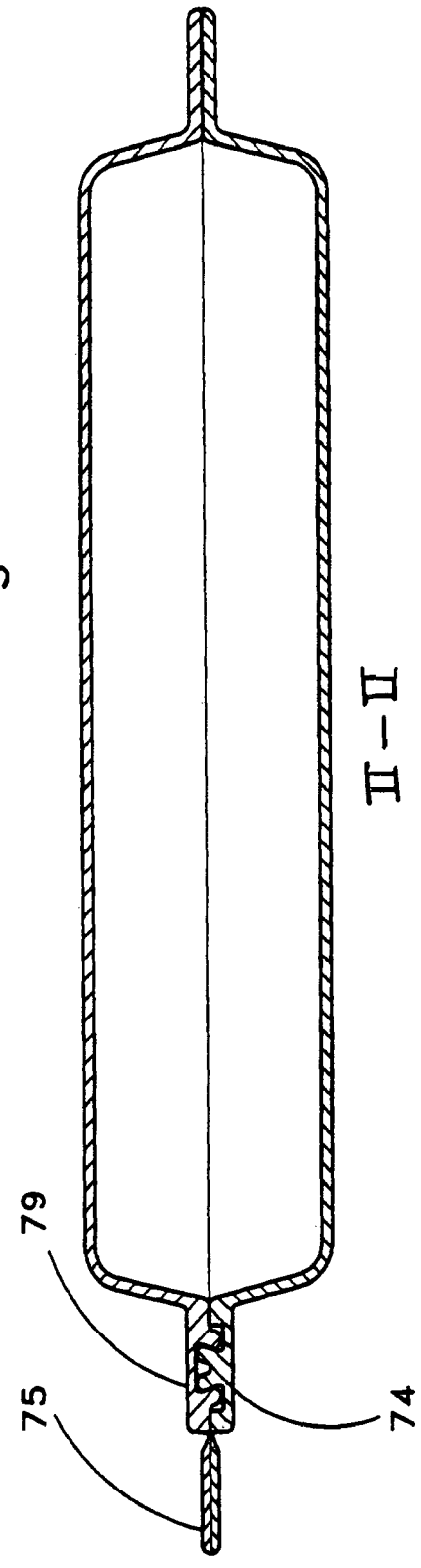
Fig. 27A
Fig. 27B

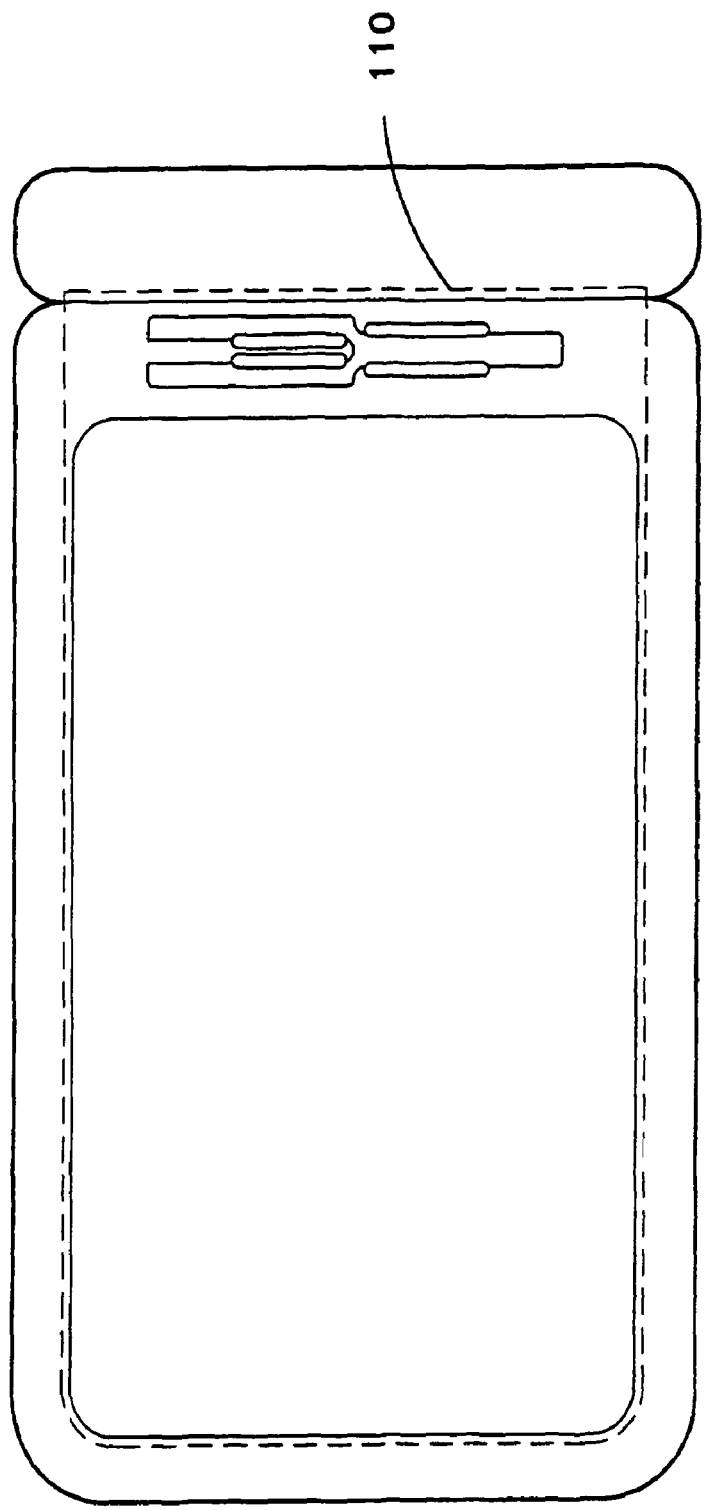
Fig. 33A
Fig. 33B

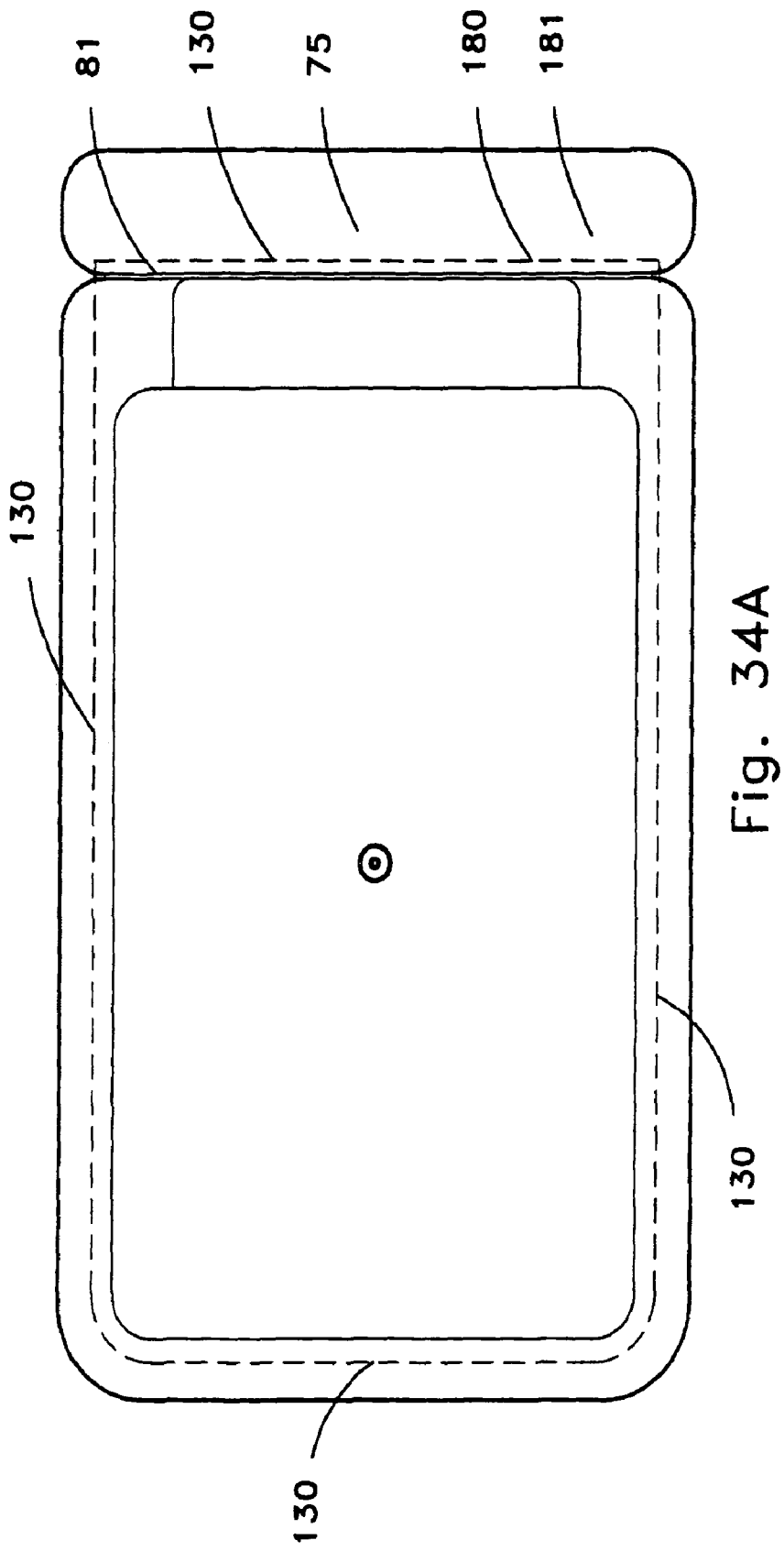
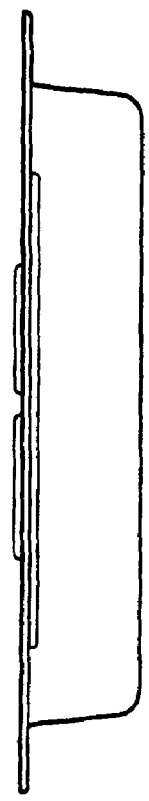
Fig. 34A
Fig. 34B

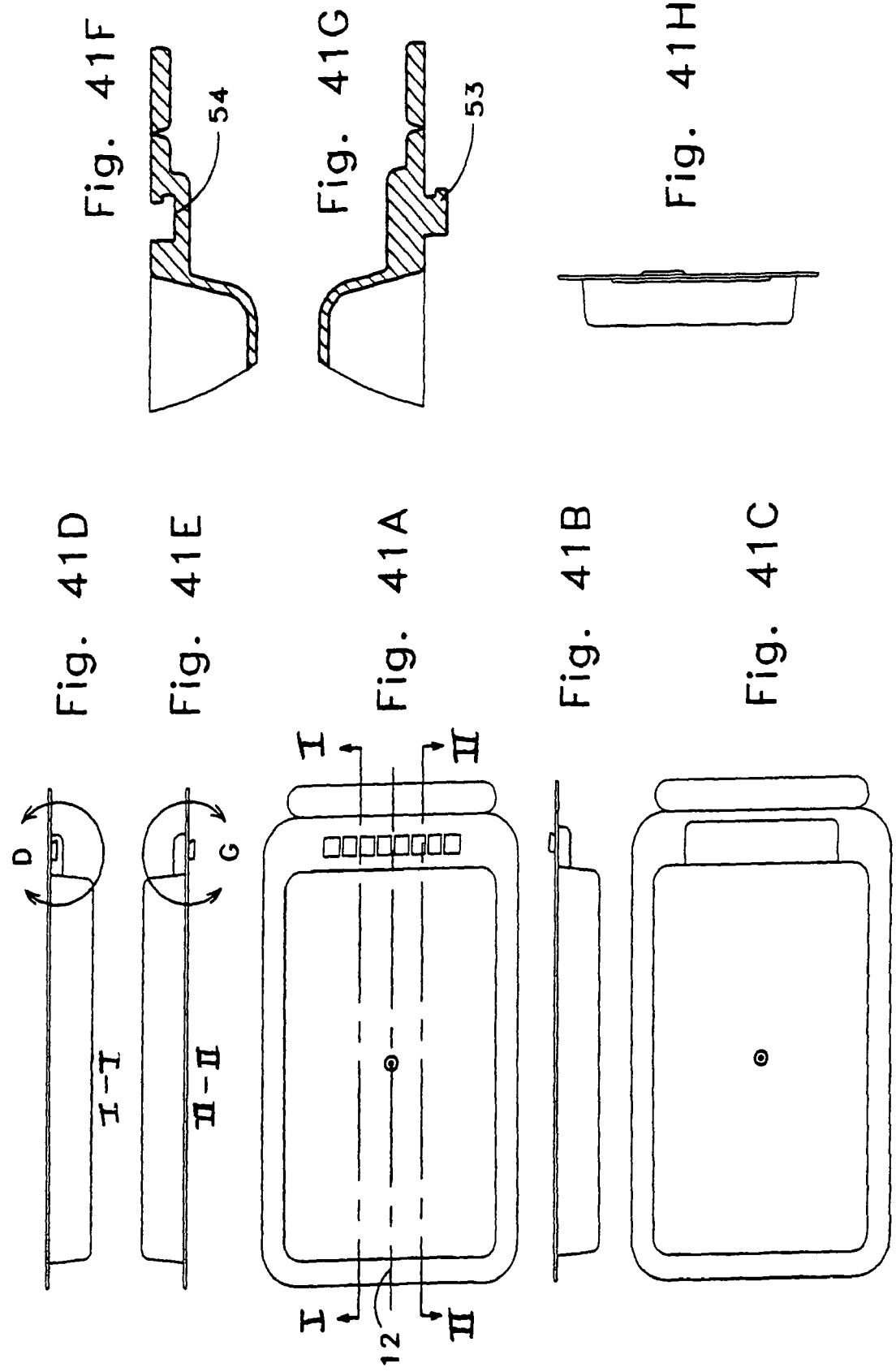

LATCHABLE CONTAINER SYSTEM

BACKGROUND OF THE INVENTION

Generally, this invention relates to a latch system for and techniques of resealably enclosing contents within a container through the use of a reusable latch device, and to a product-user safety system for and techniques of reliably indicating whether a container has been opened prior to sale. Specifically, the invention focuses on techniques for latching container openings using a latch apparatus (or device) such that manufacturing of the latch apparatus is rendered more efficient, and upon techniques for enhancing the safety of users of resealable containers through use of a tamper-resistant apparatus that operates to assure that a certain resealable container retains its original factory closure. The invention also focuses on a fluid tight seal that reduces the amount of fluid flow into and/or out of a sealed container. An additional focus is on a latch that affords improved flexing during engagement and disengagement, resulting in improved functional operation that is more acceptable to container users.

The desire to enclose container contents using a resealable (or recloseable) latch apparatus has been known in some industries for many years. In one basic form, the concept involves establishing a latch that operates to both close and open via a snap-type response to an applied force (a snap displacement-to-force response). The snap response refers to a displacement of engageable latch parts (such as positive engagement elements) in response to an applied force, wherein upon engaging (closing) and disengaging (opening) of corresponding engagement parts, there is observed a threshold displacement-to-force response. More specifically, during closing of the latch, there is, upon initial contact of the corresponding engageable latch elements that typically oppositely face one another, an increase in the applied force that results in no (or very little) relative displacement of the engageable latch elements. This force increases until it reaches a threshold value, at which point there is a "snap" response and there is observed a significant relative displacement of the engageable latch parts—indeed, this displacement typically is the maximum allowable displacement and may enable (in combination with other mechanical effects) any attached container parts to be retained in a closed position. During opening of the closed latch apparatus, a similar threshold force response may be found—the initial application of the force (a tension force as applied on the engaged latch parts) intended to open the latch does not result in relative displacement of engaged latch parts (except for perhaps some initial displacement associated with "play" in the engaged latch apparatus). The applied force increases until a threshold value is reached, at which point a relative displacement (a yielding) sufficient to disengage the latch parts and open the latch apparatus is observed. Importantly, this is unlike embodiments of patents such as U.S. Pat. Nos. 3,063,487 and 5,472,281, inter alia, where such a snap displacement-to-force response is not shown.

Often, such a tension yieldable, resealable closure apparatus is used on a container that is designed for squeeze-activated opening. Essentially, with such a squeeze-openable container, (or squeeze-openable latchable container if it includes a latch) the container is designed such that the application of a compressive force to the end edges of a closed (or shut) container opening is translated into a tension force that acts to force open the container opening that is in a closed position.

A significant problem associated with such tension yieldable, engageable, resealable latches is not necessary in their operation, but instead manifests itself in the manufacturing phase. Many designs (see, e.g., U.S. Pat. Nos. 2,520,467, 3,110,335, 3,176,743, 3,280,870, 3,426,814 and 5,623,980, inter alia) have one side of the latch apparatus different from the other side of the latch apparatus. Of course, the manufacture of a second side of such a latch cannot be conducted using precisely the same apparatus (such as a mold) that is used to manufacture the first side of such a latch. It is precisely this manufacturing limitation or inefficiency that at least one embodiment of the present invention addresses.

The desire to assure or enhance the safety of users of contained products by assuring or enhancing the safety of the contents of unopened, resealable containers has also been known in some industries for years. What may be termed a tamper-resistant seal found on, e.g., plastic soda bottles, is well known to consumers and in the bottling industry. However, there appear to be no apparatus that act to assure the unopened condition of squeeze-openable containers that have reusable latches. There also appear to be no apparatus that act to assure the unopened condition of a container having a low perimetrical aspect ratio, linear reusable latch (where linear in this context indicates non-circular, although the latch axis may have a slight curve and certainly may be straight). Further, there appear to be no apparatus that act to assure the unopened condition of a container whose latch is made of two substantially identical side parts.

The desire to assure the unopened condition of container contents, or more generally, to simply prevent the transfer of fluid across a container membrane, has been known in certain industries for many years, as has the desire to provide a reusable latch that is operable to repeatedly open and close a container. However, design limitations of existing seals and latches compromise their applicability and functionality. At least one embodiment of the invention addresses each of these needs.

SUMMARY OF THE INVENTION

The present invention includes a variety of aspects that may be selected in different combinations based upon the particular application or needs to be addressed. In one basic form, the invention discloses the use of a latch that has two side parts (or more generally latch elements) that are identical in size and shape (although perhaps oriented oppositely in an assembled configuration). Such a latch may be what is termed a double divergent reusable latch, a hooked tongue and groove reusable latch, or any other type of latch that has two substantially identical sides and contains positive engagement elements. In another basic form, the invention discloses the use of a tamper-resistant apparatus that operates to indicate whether a certain resealable container retains its original factory closure. The invention also discloses a fluid tight seal that acts to prevent the flow of fluid to and/or from a container enclosure. Further, the invention discloses a latch design that does not contain identical side parts and that results in improved latch operation. Naturally, as a result of these several different and potentially independent inventive aspects, the objects of the invention are quite varied.

One of the broad objects of the invention is to facilitate and/or increase the efficiency of the latch (and/or latchable container) manufacturing process by designing a latch apparatus that has substantially identical component side parts (e.g. latch elements), thus obviating the need for two different latch part manufacturing apparatus (such as a mold, as but one example). A goal can also be to provide a design for a side part of a latch apparatus that can serve also as the second side part of the latch apparatus.

Another broad goal of the invention is to provide an increase in the safety of users of squeeze open containers that have reusable latches, of containers that have a linear reusable latch (a non-circular reusable latch, although it may have a slight curve and certainly may be straight) that has a low perimetrical aspect ratio, and of squeeze-openable containers that have a low perimetrical aspect ratio reusable latch. This increase may result from the invention's provision of an unopened assurance element that operates as a type of tamper-resistant apparatus to assure that a certain resealable container retains its original factory closure. Another broad goal of the invention is to provide a fluid tight seal that avoids the functionality and applicability compromising design limitations of existing seals and latches.

Naturally, further objects of the invention are disclosed throughout other areas of the specification and claims.

BRIEF DESCRIPTION OF THE DRAWINGS

Drawing descriptions presented in this application, in addition to references to figure parts, are not to be construed as limiting the invention, any embodiments thereof, or claims, including elements and limitations thereof.

FIG. 5 shows cross-section views of one ornamental container design of a latchable container along lines BB and CC of FIG. 4.

FIG. 27 shows cross section views (along lines BB and CC) of a latchable container having a tamper resistant feature.

FIG. 33(a) shows a plan view of an internal side of a latchable container element having a tamper resistant apparatus, and shows a possible fluid-tight seal location. It may also be said to depict an internal side of a latchable container part having a tamper resistant apparatus and to show a possible fluid-tight seal location. The fluid-tight seal may be at or beyond the dashed line. FIG. 33(b) shows a side view of a latchable container element having a tamper resistant apparatus. It may also be said to depict a latchable container part having a water-tight tamper resistant apparatus. Note that the fluid-light seal may be at or outside of the dashed line 110.

FIG. 34(a) shows a plan view of an external side of a latchable container element having a tamper resistant apparatus and a fluid-fight seal. It may also be said to depict an external side of a latchable container part having a tamper resistant apparatus and a fluid-tight seal. FIG. 33(b) shows a side view of a latchable container element having a tamper resistant apparatus and a fluid-tight seal. It may also be said to depict a latchable container part having a fluid-tight seal and a tamper resistant apparatus.

FIG. 36(b) shows a side view of a container element and a latch element having separated hooked tongue insertion elements. It may also be viewed as depicting a container part and a latch element having separated hooked tongue insertion element that form a positive engagement element:

FIG. 39b shows a squeeze openable container having the latch element of FIG. 39a.

FIG. 41 shows different views of a hooked tongue and groove latch of a substantially identical, mutually engageable reusable latch design.

DETAILED DESCRIPTION OF THE PREFERRED EMBODIMENTS

Figure 1:
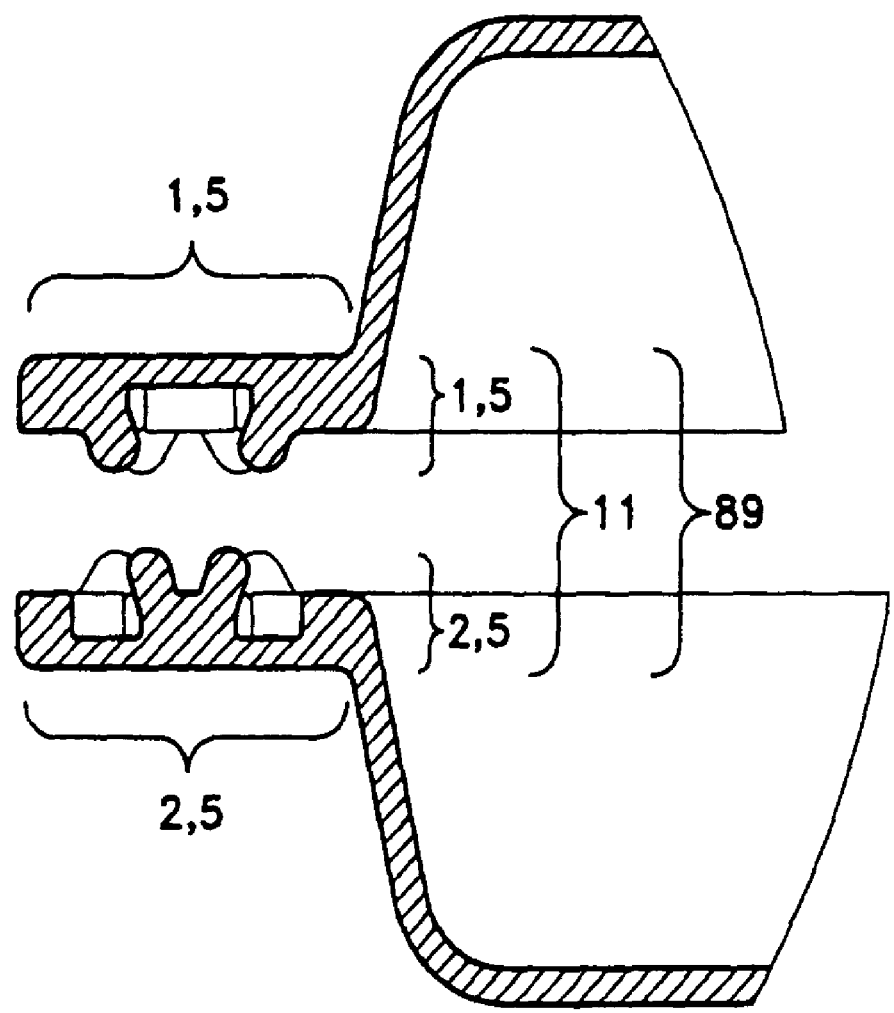
FIG. 1 shows a side-sectional view of a double divergent latch in a disengaged configuration.
Figure 2:
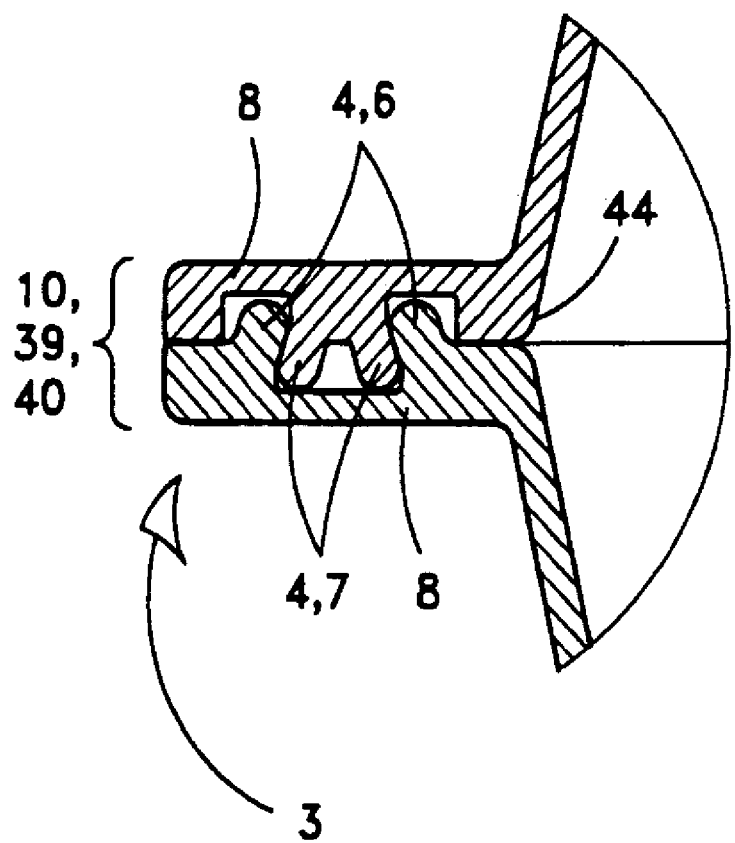
FIG. 2 shows a cross-section view of a double divergent latch in an engaged configuration. Specifically, it shows cross-section of circular portion H of FIG. 5.
Figure 3:
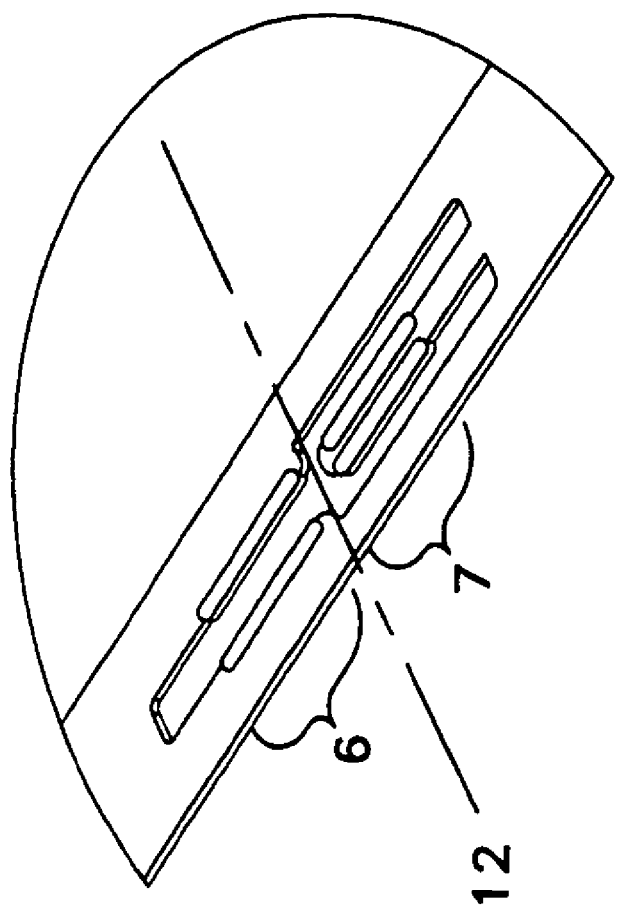
FIG. 3 shows a perspective view of a latch element.
Figure 4:
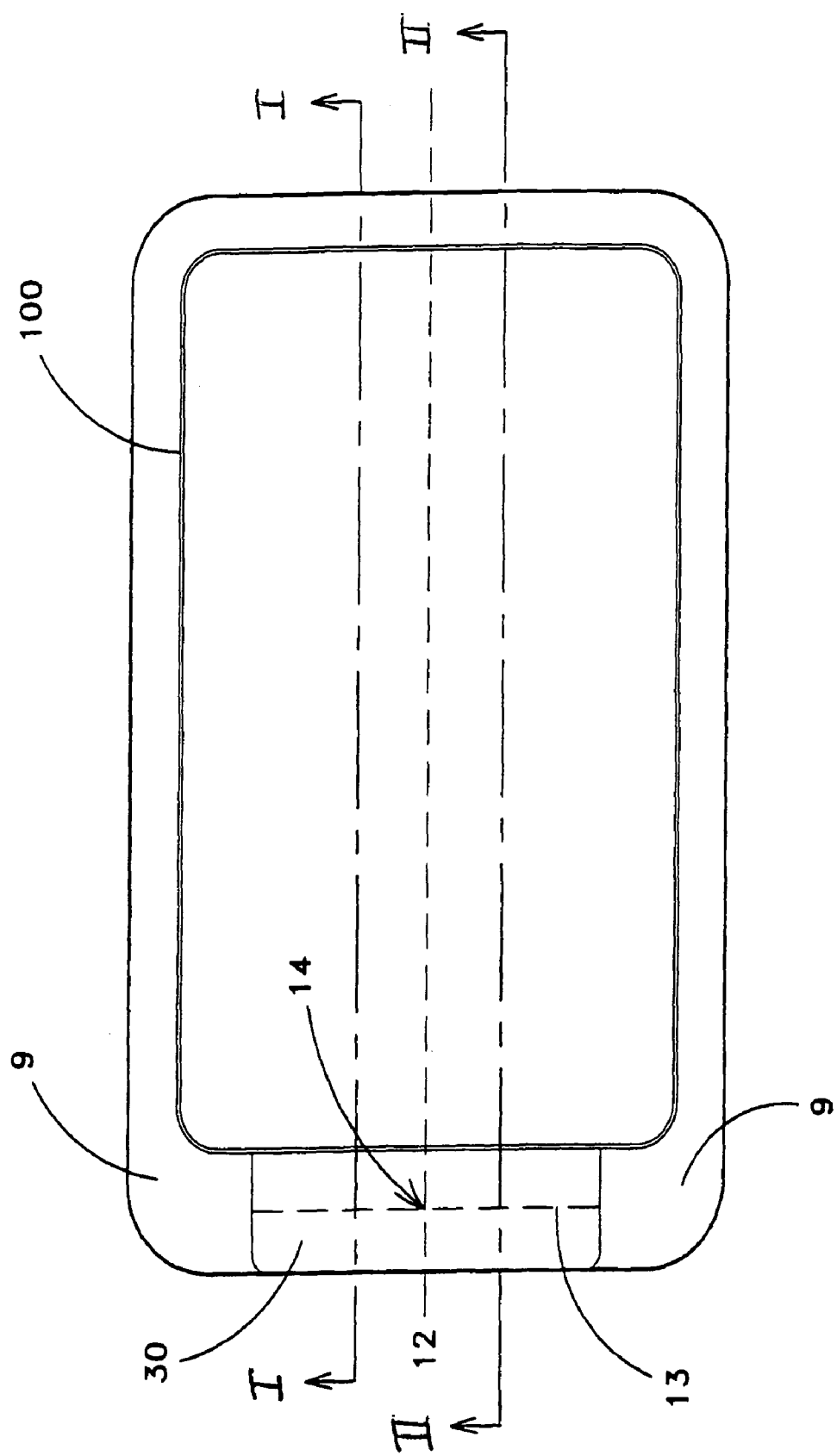
FIG. 4 shows a plan view of one ornamental container design of a latchable container as utilizing a functional latch. It may also be said to depict a plan view of the external side of a latchable container part.
Figure 6:
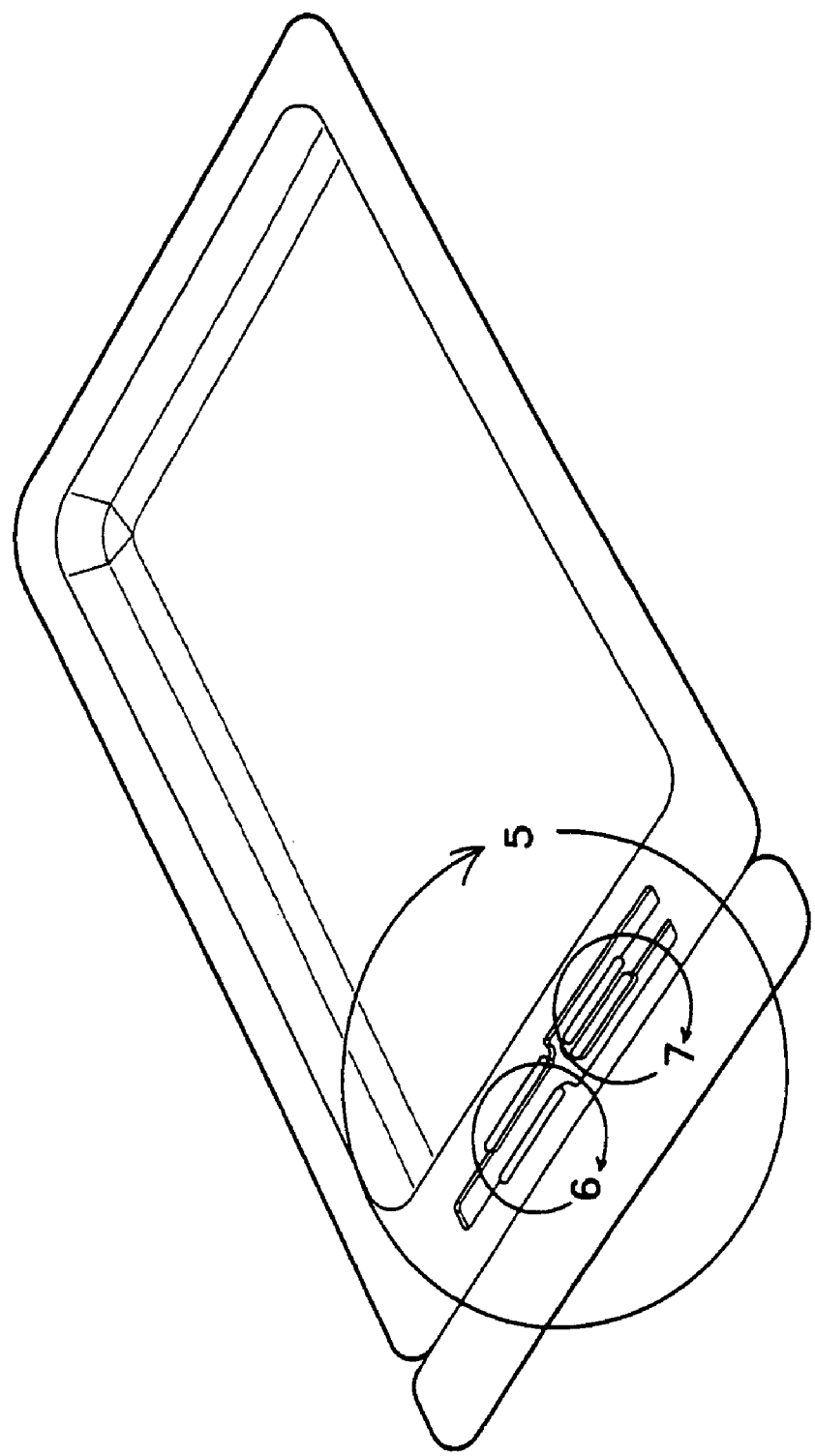
FIG. 6 shows a perspective view of a container element and a double divergent latch element. It may also be said to depict a latchable container part.
Figures 7A, 7B:
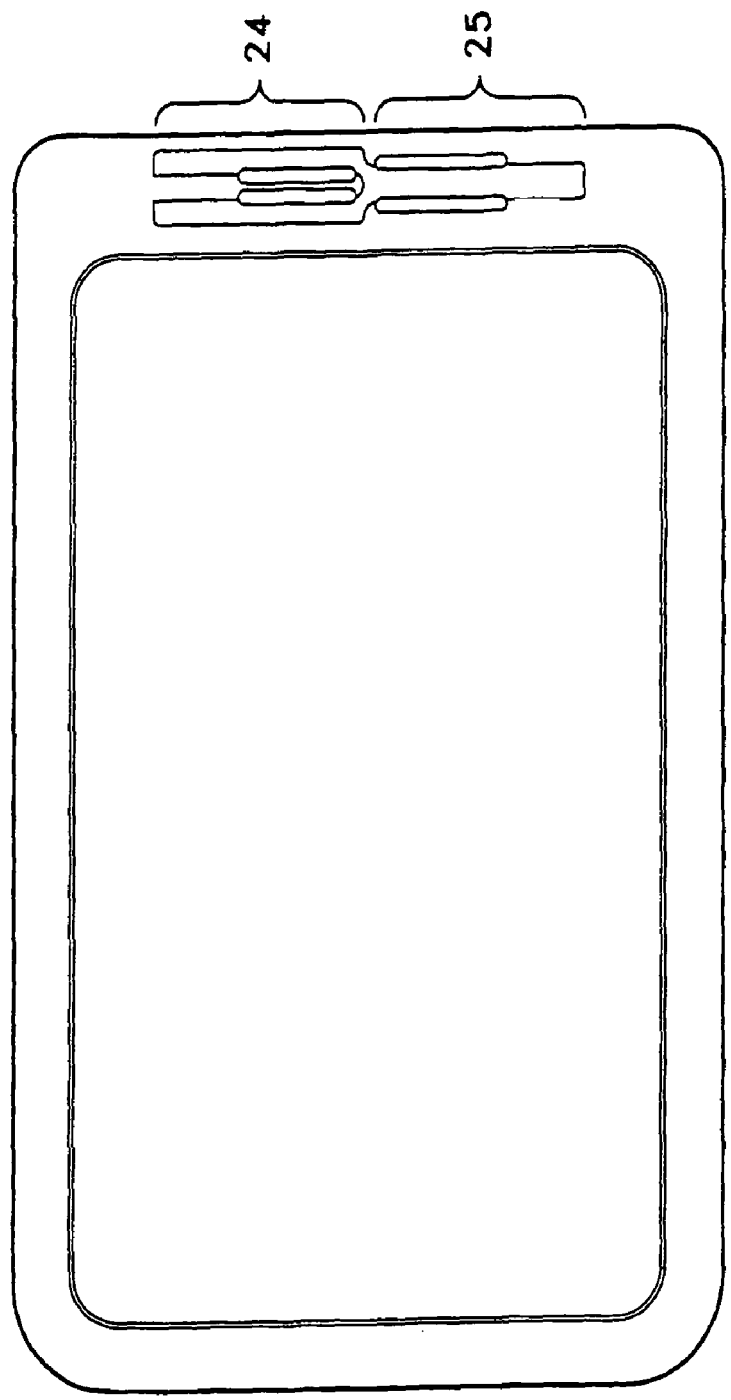
FIG. 7(a) shows a plan view of an internal side of a container element and a double divergent latch element. It may also be said to depict an internal side of a latchable container part.
FIG. 7(b) shows a side view of a container element and a double divergent latch element. It may also be said to depict a side view of a latchable container part.
Figure 8:
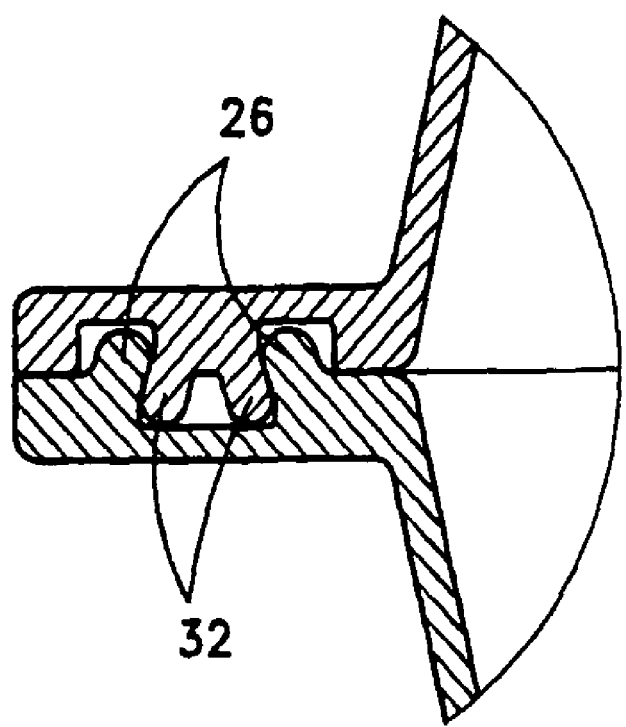
FIG. 8 shows a cross-section view of an engaged configuration double divergent latch.
Figure 9:
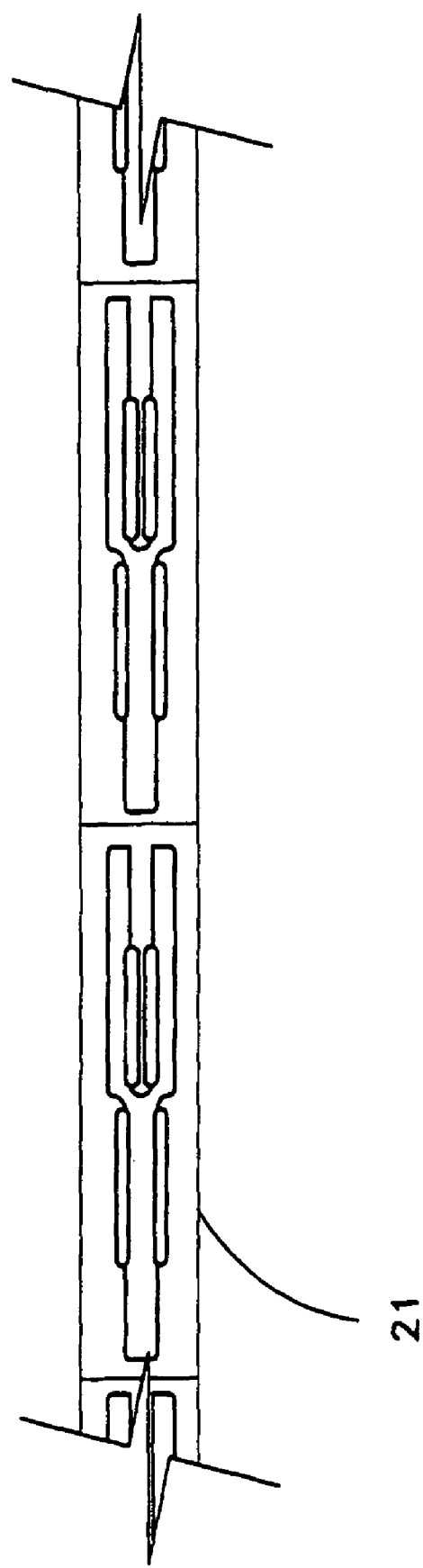
FIG. 9 shows a plan view of a split positive engagement element latch design.

As mentioned earlier, the present invention includes a variety of aspects which may be combined in different ways. Each of these aspects is first discussed separately.

Generally, one embodiment of the latch apparatus may comprise two substantially identical, mutually engageable latch elements 1 and 2 configured to oppositely face each other in an assembled configuration 3. Each may also comprise a tension yieldable, positive engagement element 4. A latch apparatus (or device) implies that the apparatus is engageable, whether or not the term engageable is used in conjunction with the term latch. Similarly, the terms latch element and simply latch imply engageability. Further, every latch may be reusable as reopeneable and recloseable. A latch element, which in one embodiment is 5, may be any element that comprises a positive engagement element and that is engageable with another latch element to repeatedly close and open a container. The two substantially identical, mutually engageable latch elements (which may be 1 and 2 in one embodiment but naturally other substantially identical engageable latch components are deemed within the scope of the inventive technology) are substantially identical in shape and arc engageable with one another. In an assembled configuration, they oppositely face one another so that the tension yieldable positive engagement element (e.g., such as receptor element 6 and insertion element 7) that each latch element comprises is shaped to engage the other tension yieldable, positive engagement element (i.e., the tension yieldable, positive engagement element of the other latch element). This engagement occurs upon the application of what is typically a compression force applied to the positive engagement elements. Each of the latch elements (1 and 2 in at least one embodiment) is potentially a larger element than the tension yieldable, positive engagement element 4 because each latch element may comprise, e.g., a structural foundation 8 that supports any component parts of the positive engagement element (such as an insertion element and receptor element).

The tension yieldable, positive engagement element may be any element that is engageable to create a retention force that is disengageable or yieldable upon the application of a tension force. This tension force may be applied directly to the positive engagement elements (or the latch elements that each comprise a positive engagement element) or it may be generated by the compression of the ends of the assembled configuration latch elements (which may be achieved by squeezing any parts such as squeeze-openable-container sides 9 that may co-join the ends of the assembled-configuration latch elements 10), as but two examples. In any case, however, the resultant force on the engaged positive engagement elements is a tension away from one another.

It is important to understand that the term tension yieldable, positive engagement element may also encompass those positive engagement elements that yield under design tension even though the positive engagement elements may be designed to yield more properly under, e.g., a compressive force that is applied, e.g., by a fingernail positioned between two engaged positive engagement elements, or by a string or similar thin graspable apparatus positioned with respect to engaged positive engagement elements. Essentially, as long as the two positive engagement elements can be disengaged with a design tension force (even though such tensile disengagement may require the application of some type of handles e.g., on the outside of the latch element so that a tension can be applied to the engaged positive engagement elements), then the positive engagement element may be considered a tension yieldable, positive engagement element. It is important to note that the term tension as used in "tension yieldable" refers to the force that is applied directly to the positive engagement elements. It is also important to note that this tensile (or tension) force is a design force, meaning that it is non-destructive to the apparatus, a force within the range for which the latch has been designed, and a force that is applied in a manner that comports with that type of force application for which the apparatus is designed. Thus, the term tension yieldable, positive engagement element should be read to denote design tension yieldable, positive engagement element.

The engaged parts of the inventive technology's latch (the positive engagement elements) are amenable to and enable simultaneous disengagement (recall that there is a positive engagement element on each side) in at least one embodiment. Thus, the inventive latch may be said to comprise a simultaneously disengageable, positive engagement clement on each side of it (i.e., on each latch clement).

The positive engagement elements of at least one embodiment of the inventive technology exhibit a threshold displacement-to-force response, and thus the inventive latch (or more specifically, each latch element) of at least one embodiment may thus be said to comprise a positive engagement element that exhibits a threshold displacement-to-force engagement (or disengagement) response.

Figure 30:
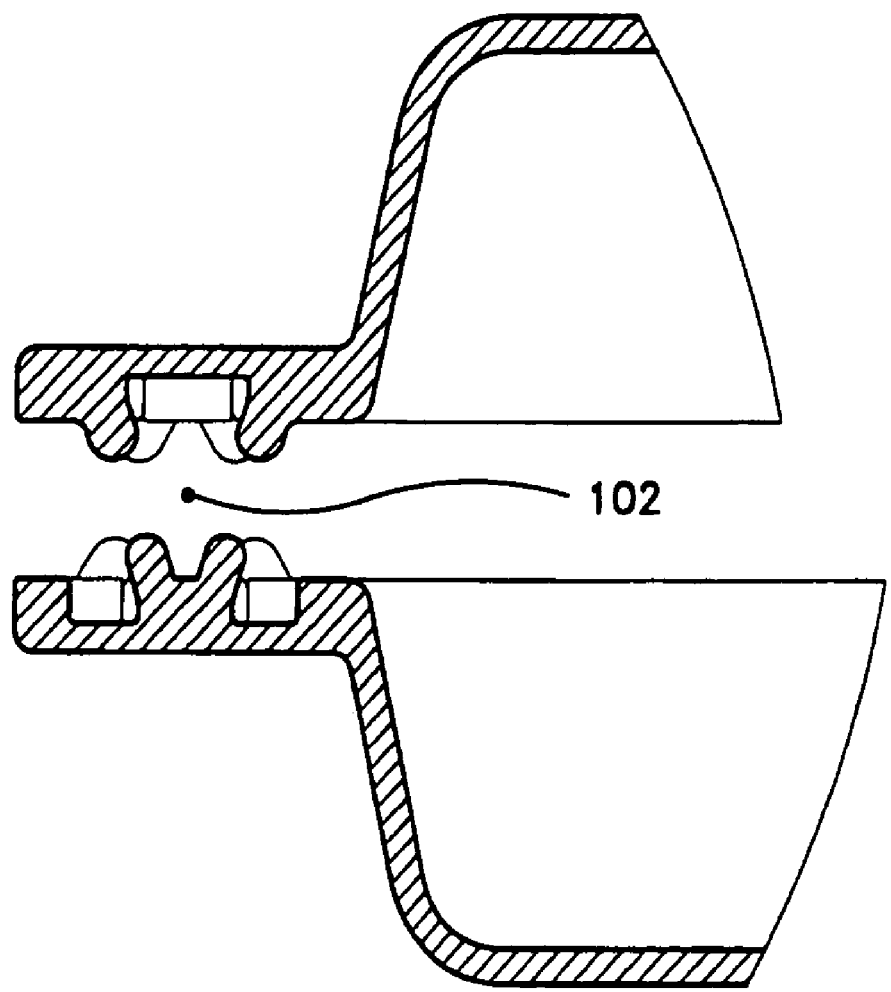
FIG. 30 shows a side-sectional view of a disengaged double divergent latch at circular section H of FIG. 27.
Figure 31B:
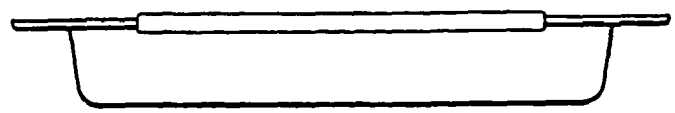
FIG. 31 shows a plan view of the external side of a container element and a latch element. It may also be said to depict an external side of a latchable container part (a half, e.g.)
Figure 31A:
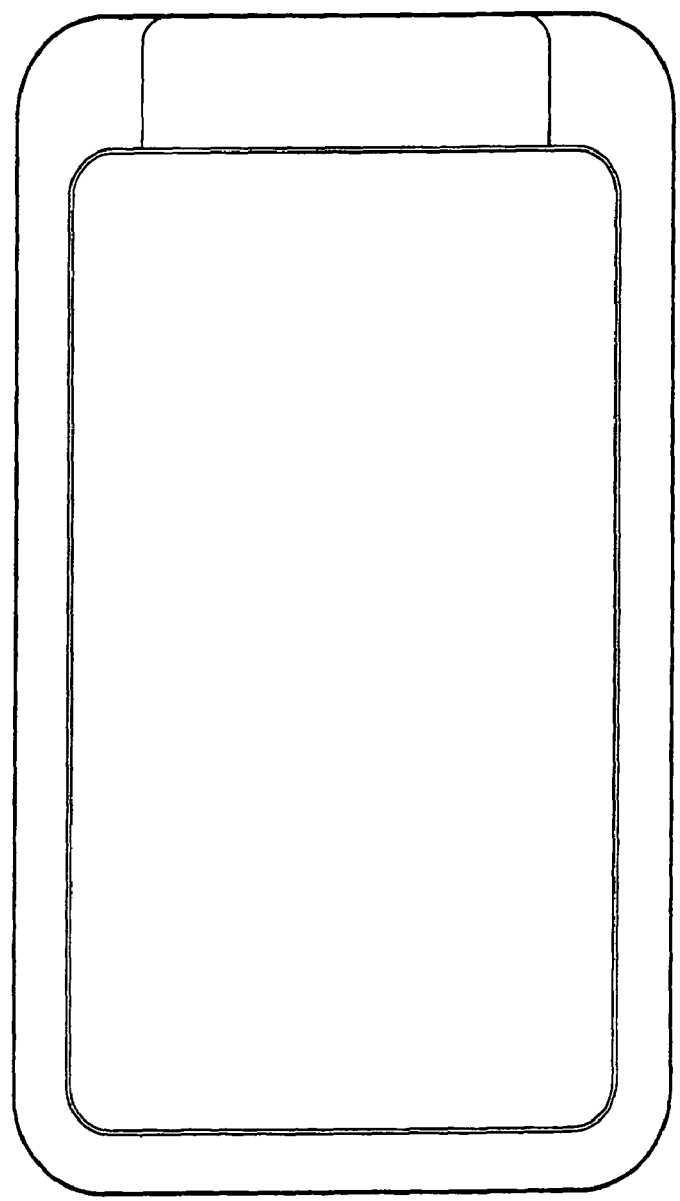
Figure 32:
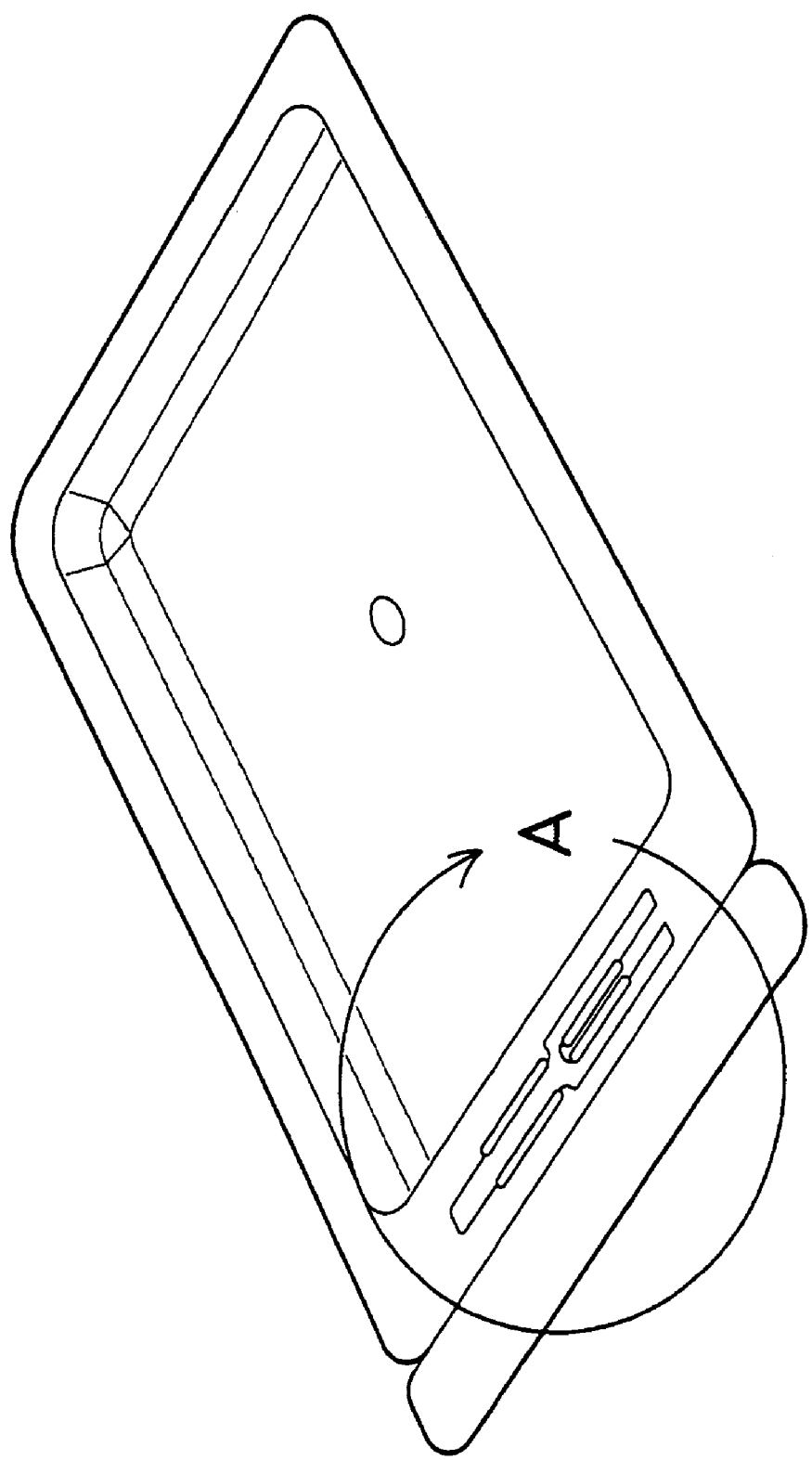
FIG. 32 shows a perspective view of the internal side of a latchable container (a double divergent latchable container) having a tamper resistant apparatus.
Figure 35:
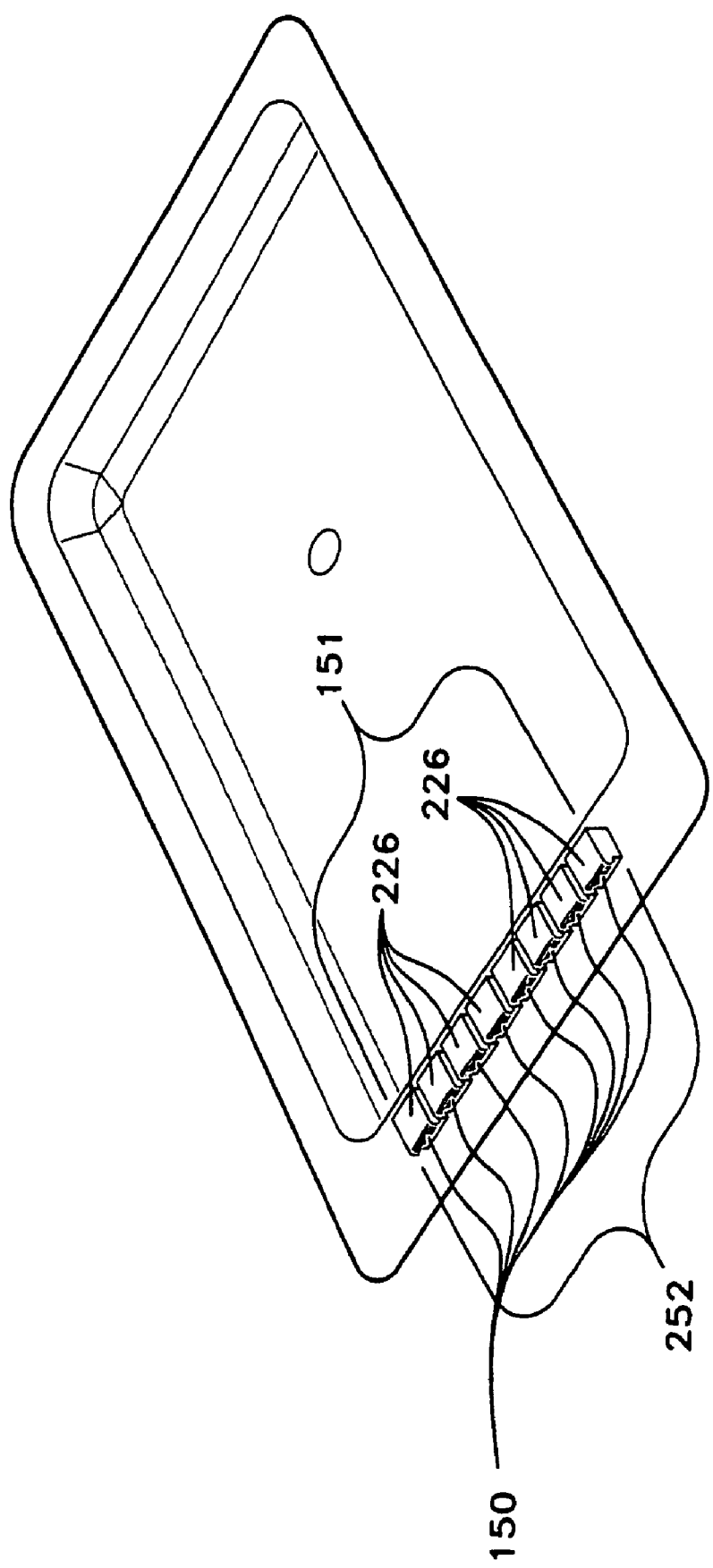
FIG. 35 shows a perspective view of an internal side of a container element and a latch element having separated hooked tongue insertion elements that form a positive engagement element. It may also be viewed as depicting a container part and a latch element having separated hooked tongue insertion elements that form a positive engagement element.
Figure 36A:
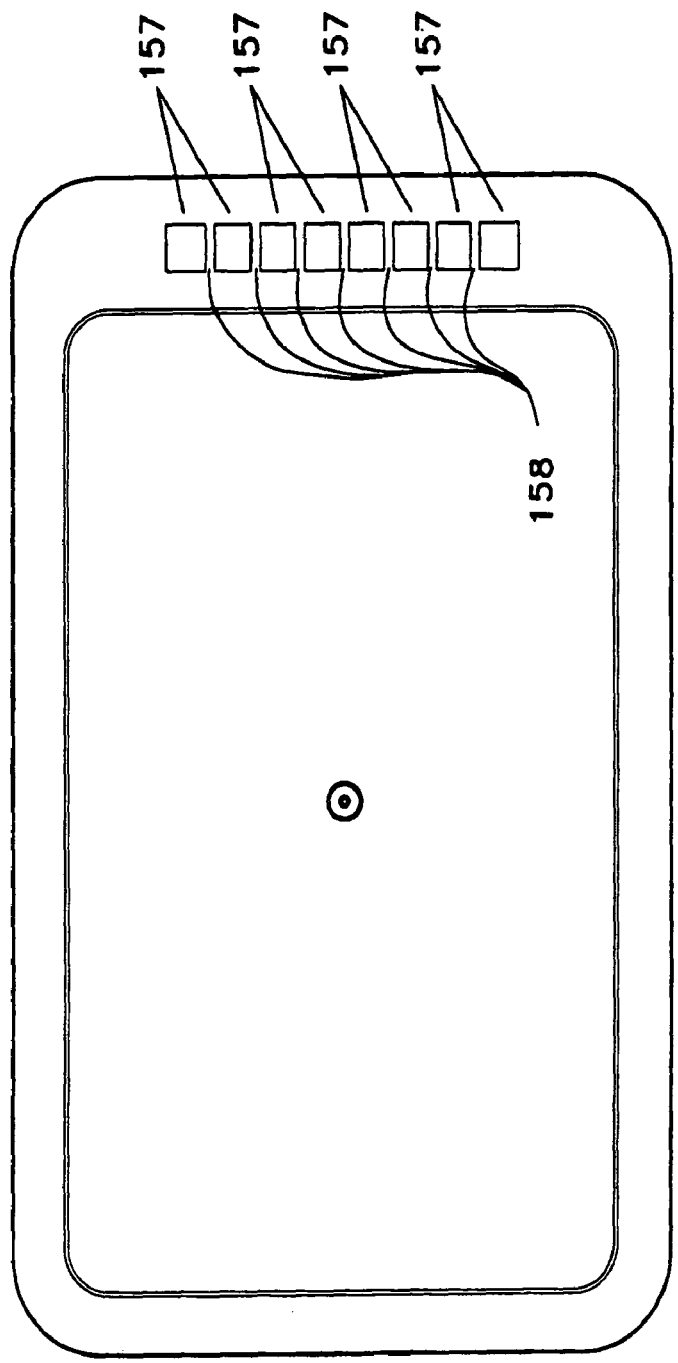
FIG. 36(a) shows a plan view of an internal side of a container element and a latch element having separated hooked tongue insertion elements. It may also be viewed as depicting a container part and a latch element having separated hooked tongue insertion elements that form a positive engagement element.
Figure 36B:
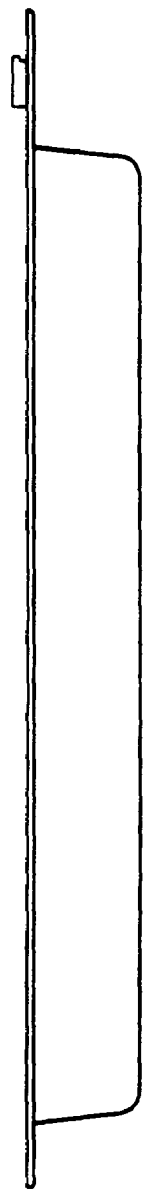
FIG. 36(b) shows a side view of a container element and a latch element having separated hooked tongue insertion elements. It may also be viewed as depicting a container part and a latch element having separated hooked tongue insertion elements that form a positive engagement element.
Figure 37:
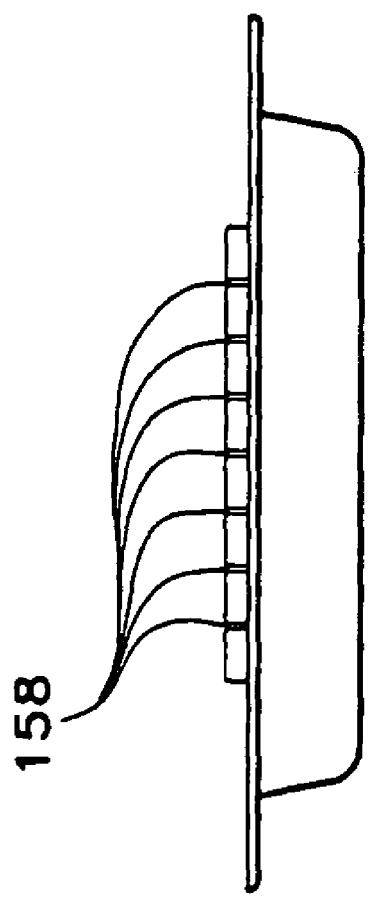
FIG. 37 shows a side end view of a container element and a latch element having separated hooked tongue insertion elements. It may also be viewed as depicting a container part and a latch element having separated hooked tongue insertion elements that form a positive engagement element.
Figure 38A:
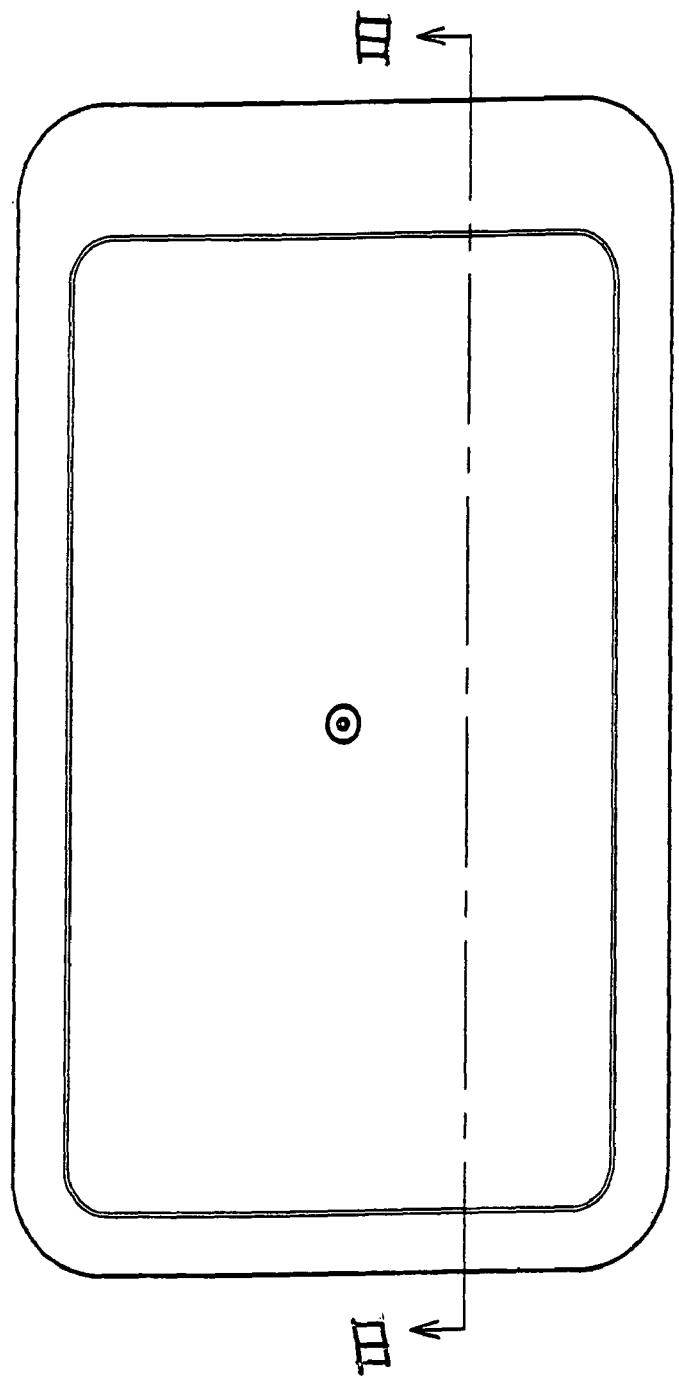
FIG. 38(a) shows a plan view of an external side of a container element and a latch element having separated hooked tongue insertion elements. It may also be viewed as depicting a container part and a latch element having separated hooked tongue insertion elements that form a positive engagement element.
Figure 38B:
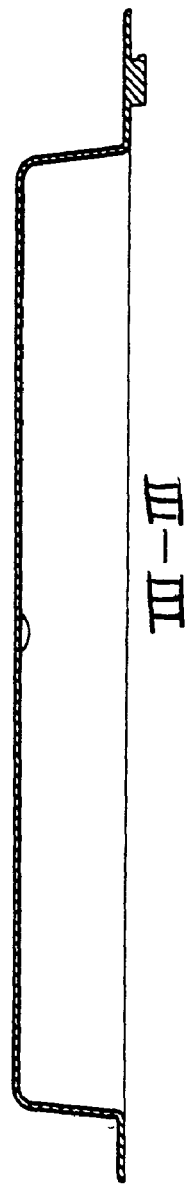

In at least one embodiment of the instant application's inventive technology, the motion (during engagement and disengagement) of any positive engagement element component parts on one side of the latch relative to any positive engagement element component parts on the other side of the latch may be characterized as substantially orthogonal to an opening axis 102 in at least one embodiment. (Note that 102, as depicted in FIG. 30, points into the paper). Thus, the positive engagement element on a latch element of at least one embodiment of the inventive technology may be said to be an engagement mode, opening-axis-orthogonally movable, positive engagement element. Further, engagement and disengagement of the latch of at least one embodiment the instant application's inventive technology may be said to involve elastic deformation in some manner. Thus, at least one of the positive engagement elements of a latch of at least one embodiment of the inventive technology may be said to be an elastically deformable positive engagement element. Of course, any of these features, either alone or in combination, may be incorporated into the claims.

Figure 10:
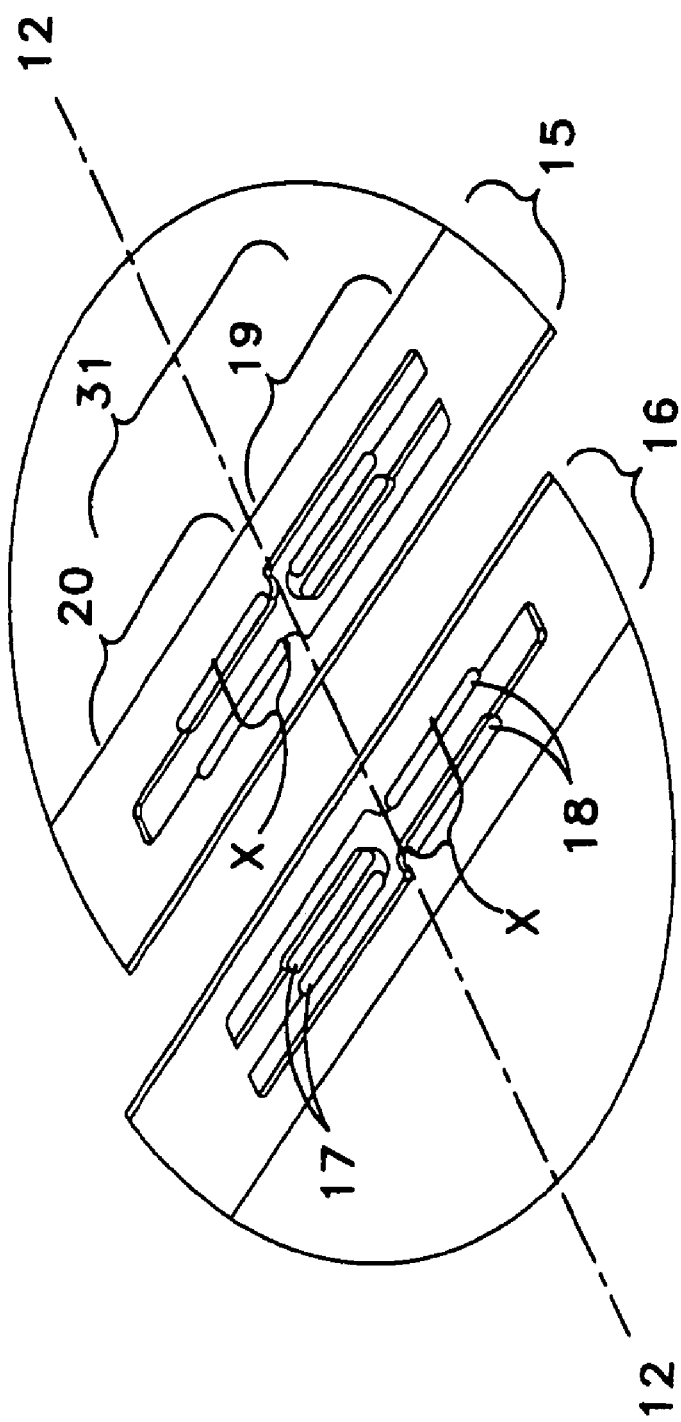
FIG. 10 shows a plan view of assembled-configuration-oppositely-facing, substantially identical latch elements that each comprise an insertion element and a receptor element along a portion of the latch element length.
Figure 11:
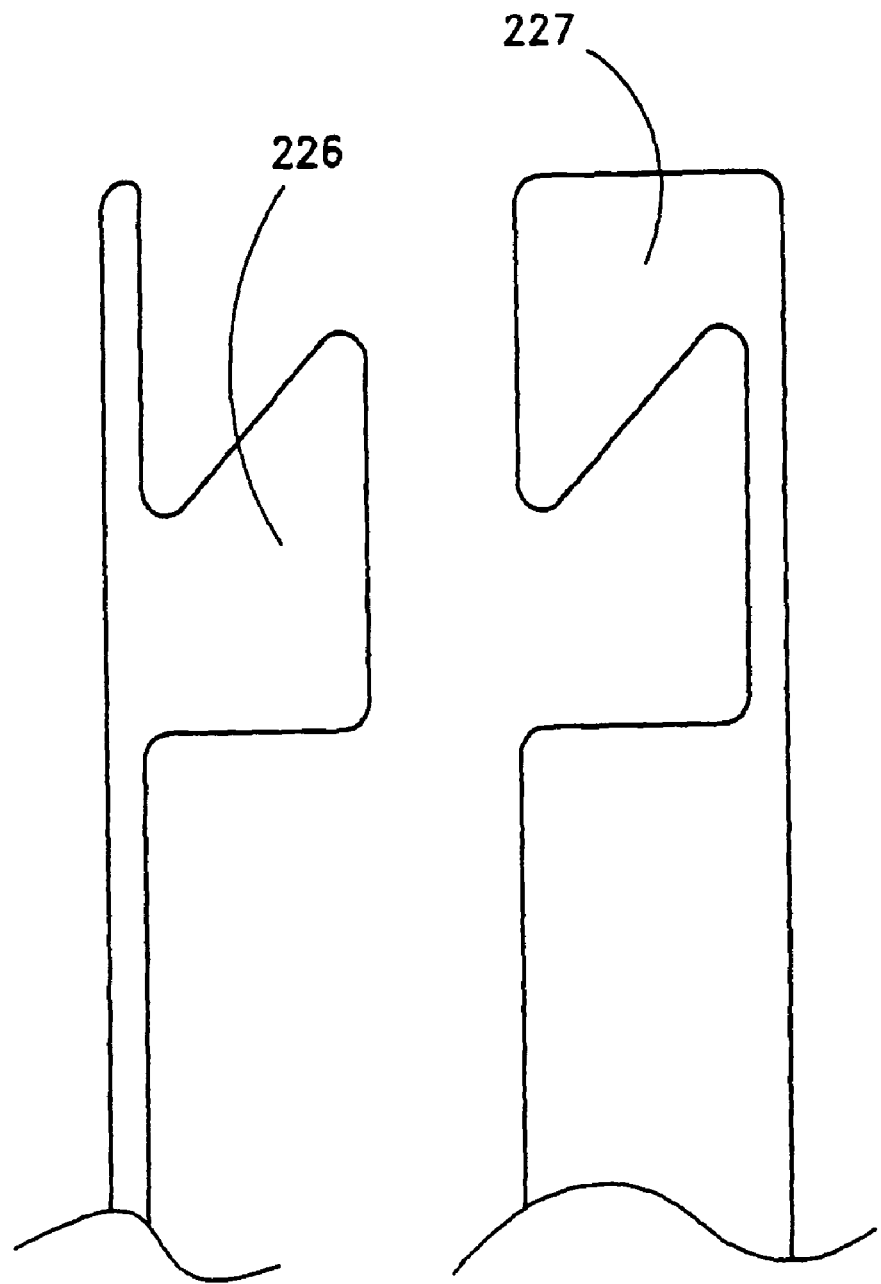
FIG. 11 shows a cross-section view of a hooked tongue and groove latch.
Figure 12:
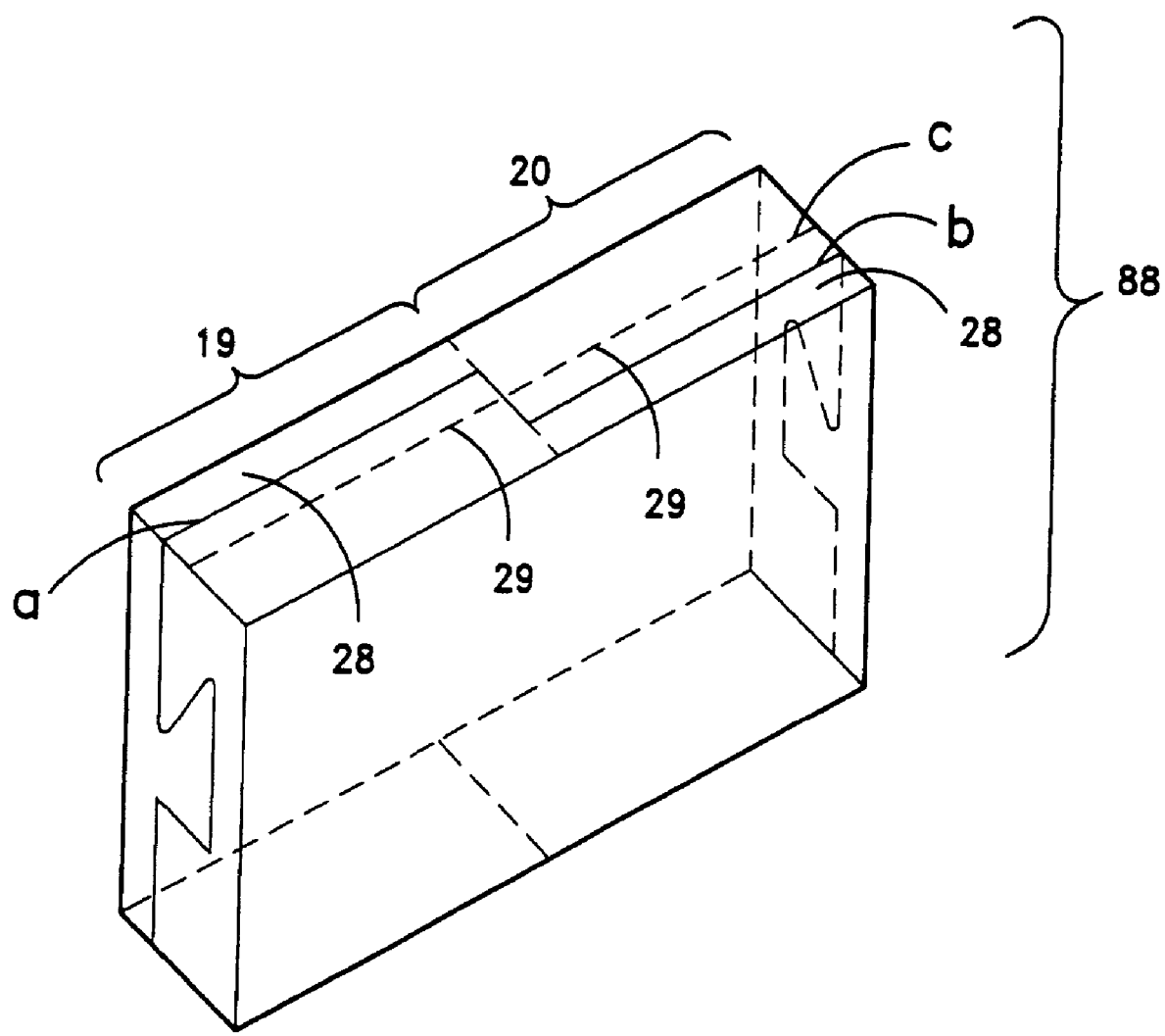
FIG. 12 shows a perspective view of a hooked tongue and groove reusable latch. Importantly, the design may be adjusted so that edges a and b are aligned with line c. Note also that the container element is not shown.
Figure 13:
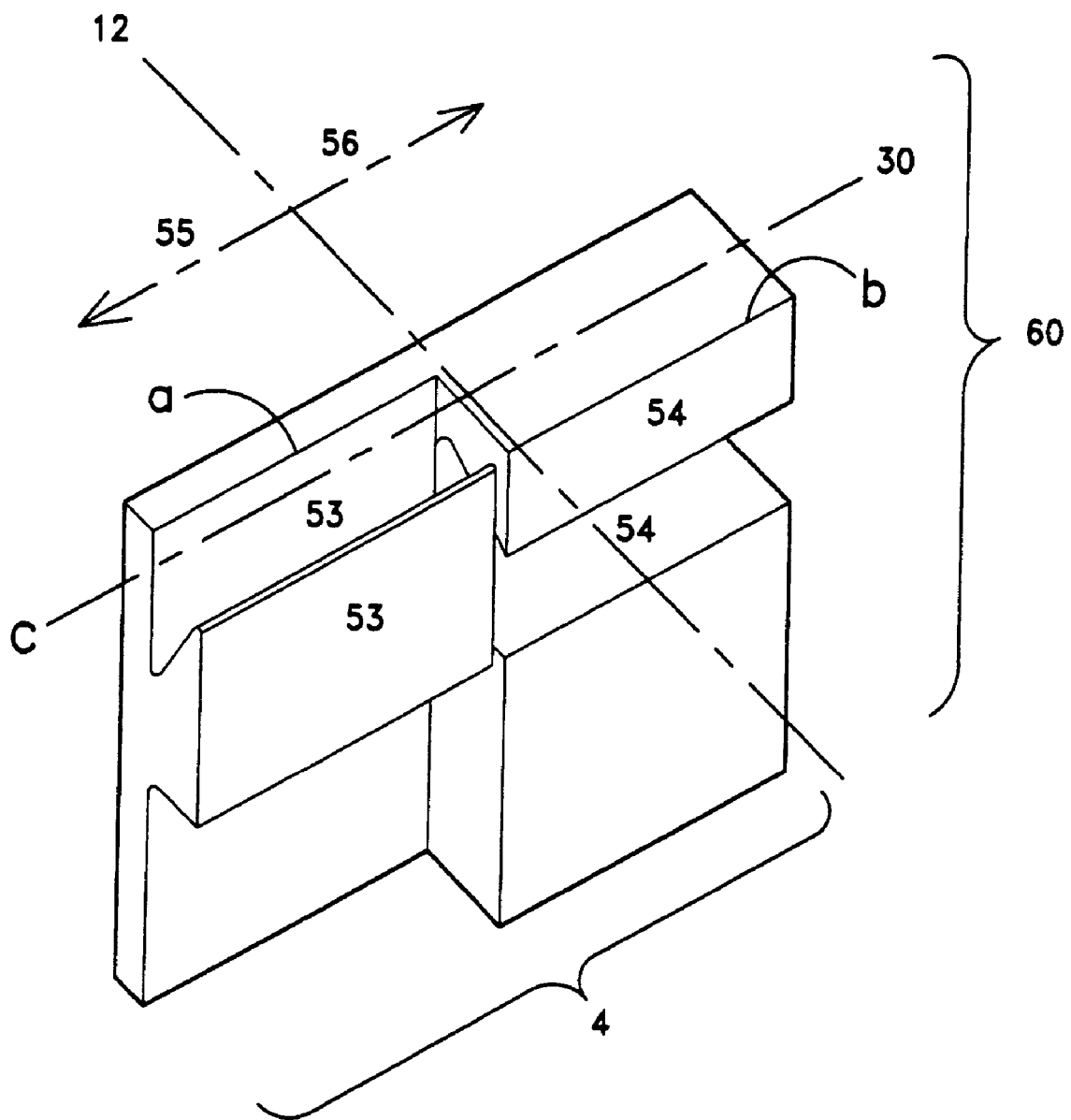
FIG. 13 shows a hooked tongue and groove latch element. Importantly, the design may be adjusted so that edges a and b are aligned with line c. Note also that the container part is not shown. Note also that this latch element may also have a center portion along the length of the latch that does not comprise a positive engagement element.
Figure 14:
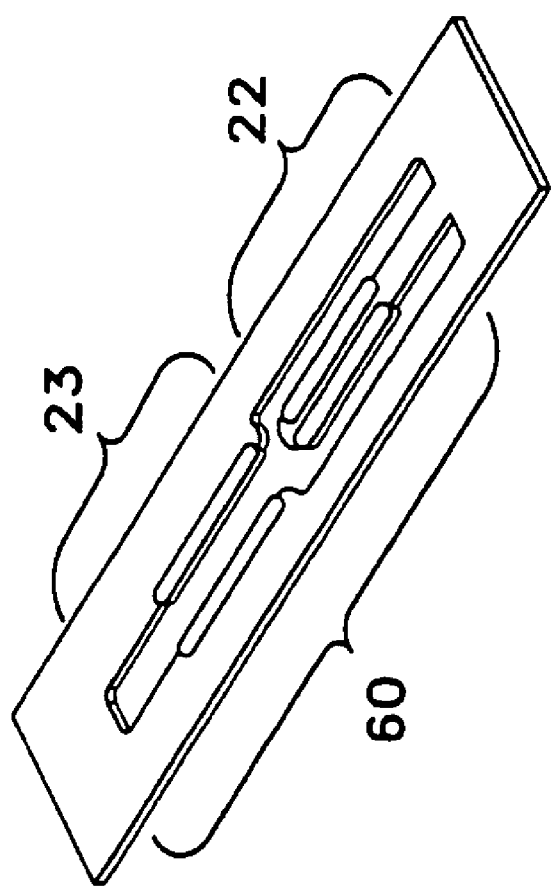
FIG. 14 shows a double divergent latch element whose positive engagement element has at least one insertion element established along substantially the entire length of the first half of the latch element and whose at least one receptor lenient is established along substantially the entire length of the second half of the latch element.
Figure 15:
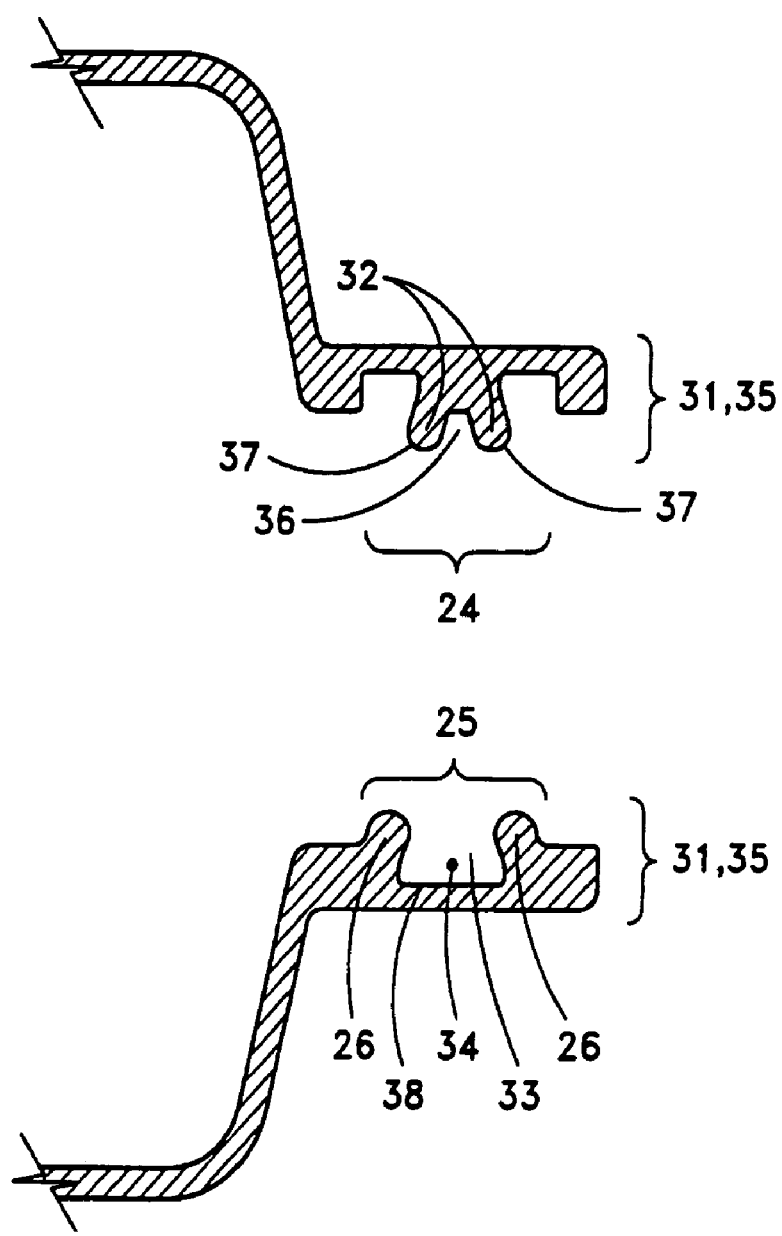
FIG. 15 shows a cross-section view of a disengaged double divergent reusable latch.
Figure 16:
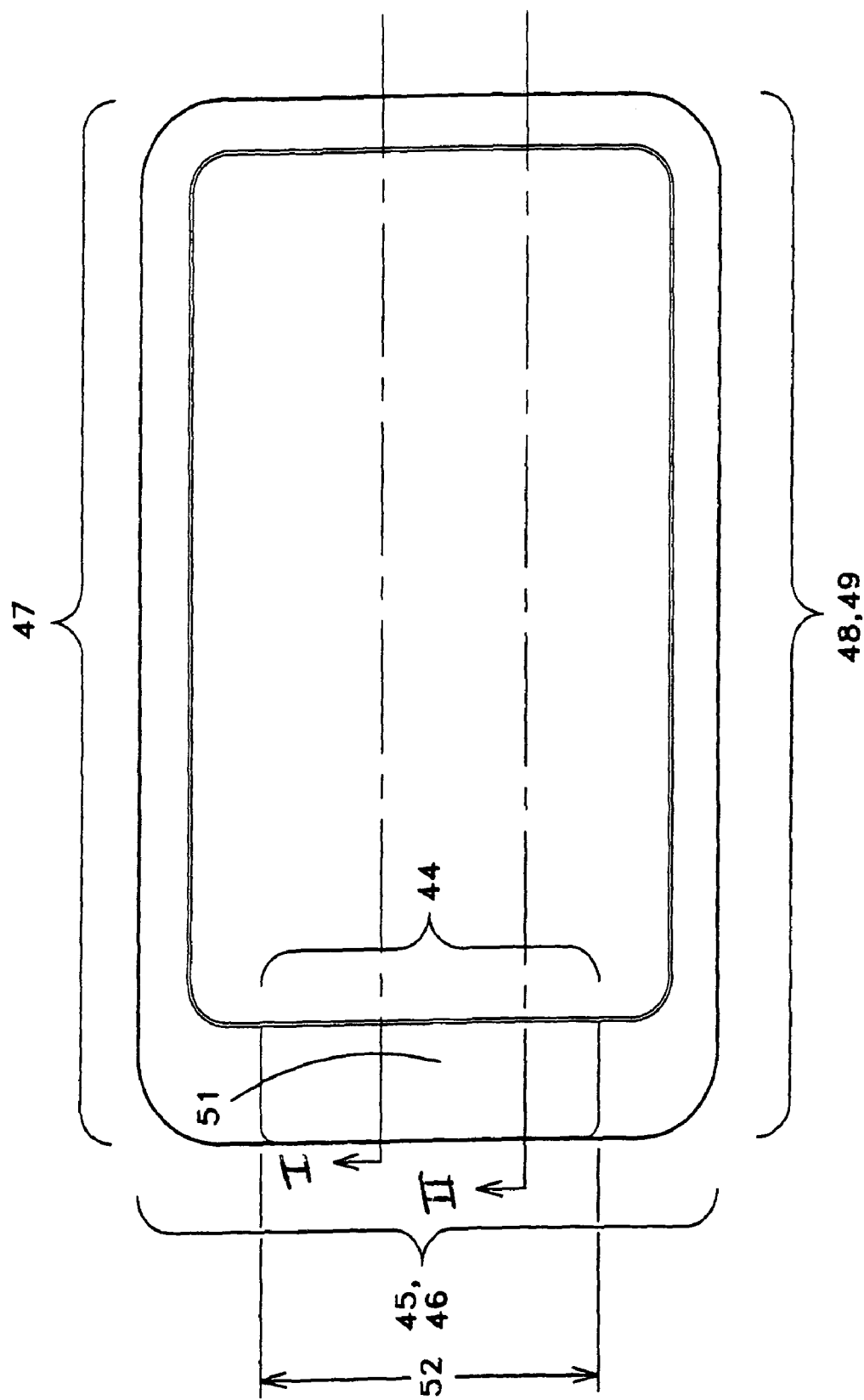
FIG. 16 shows a plan view of a latchable container.
Figure 17:
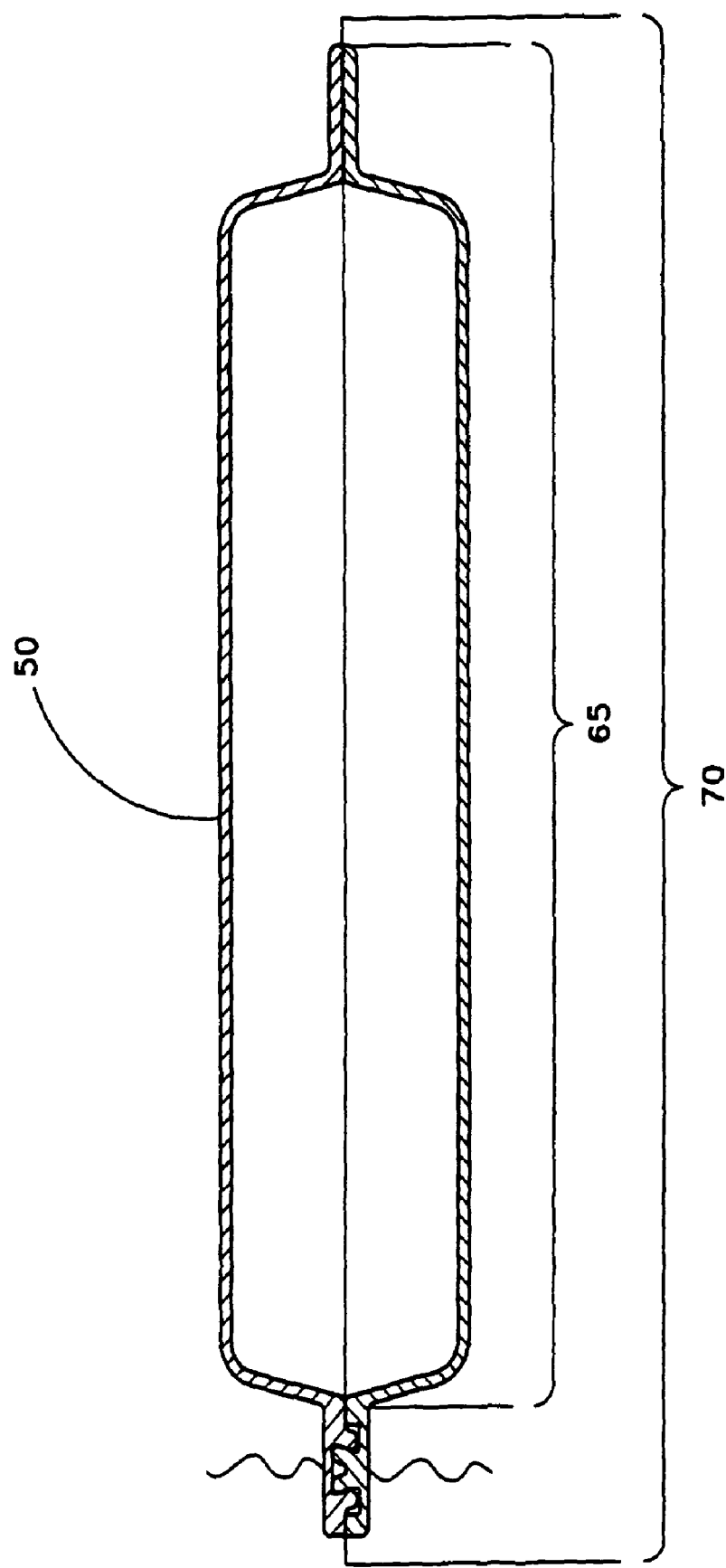
FIG. 17 shows a cross-section view of a pull-apart openable latchable container.
Figure 18:
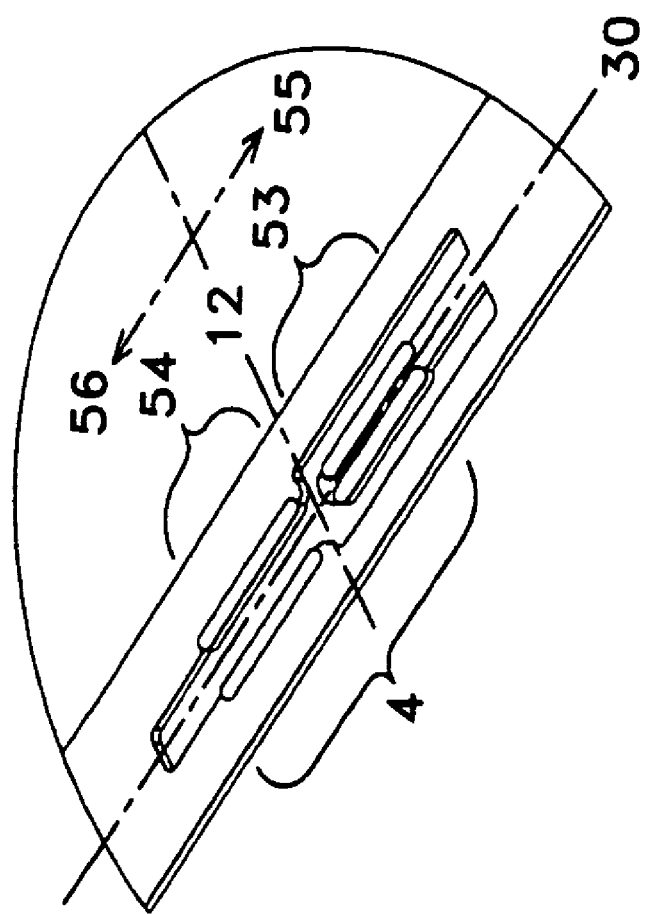
FIG. 18 shows a perspective view of a latch element that is part of a double divergent latch.
Figure 19:
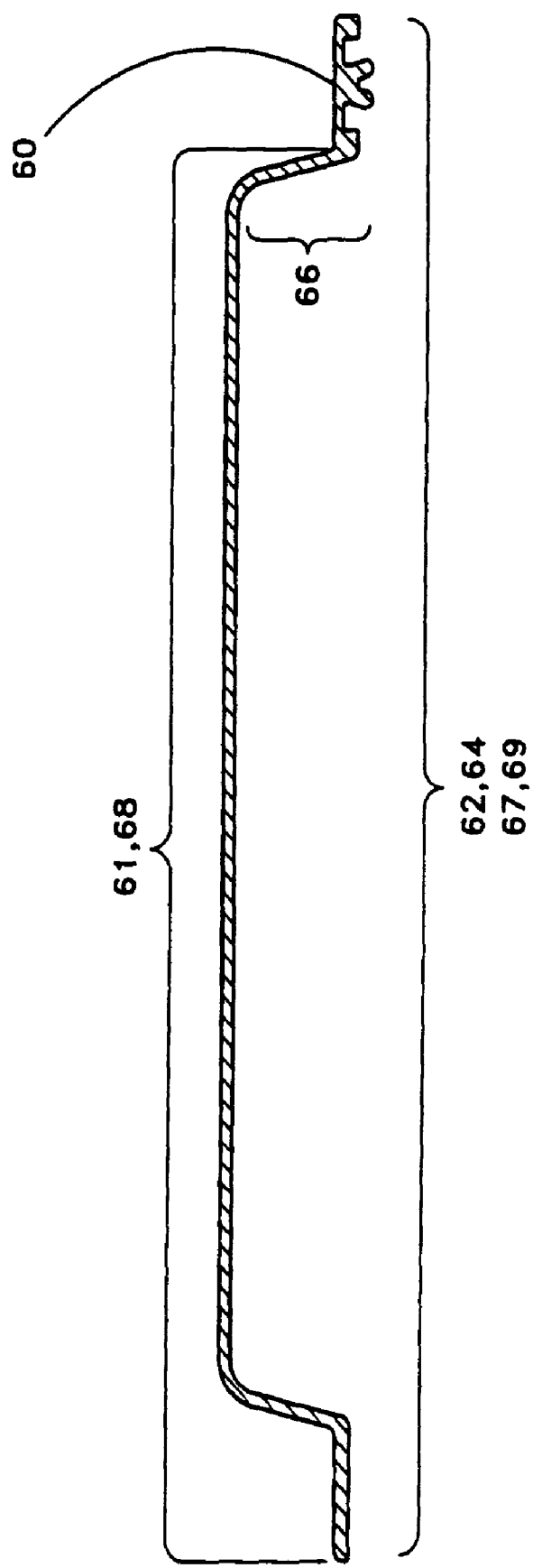
FIG. 19 shows a cross-section view of a latchable container part.
Figure 20A:
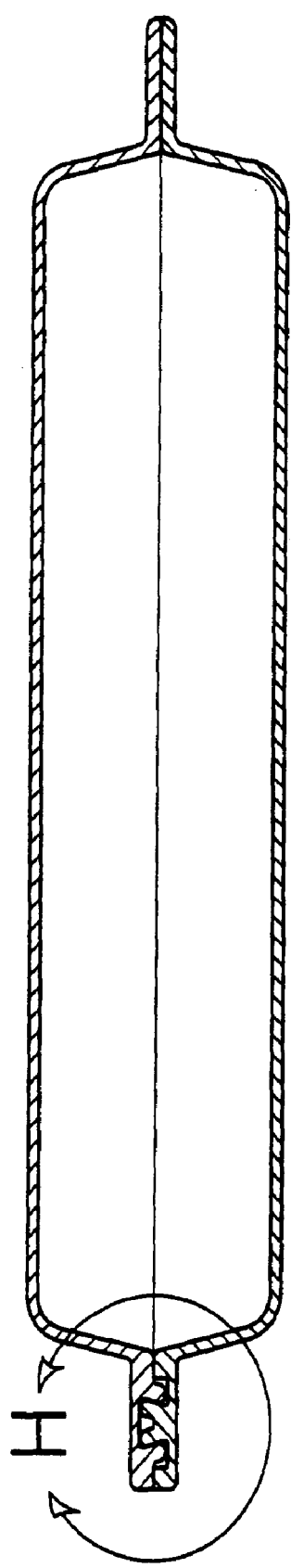
FIG. 20 shows a cross-section view of a latchable container.
Figure 20B:
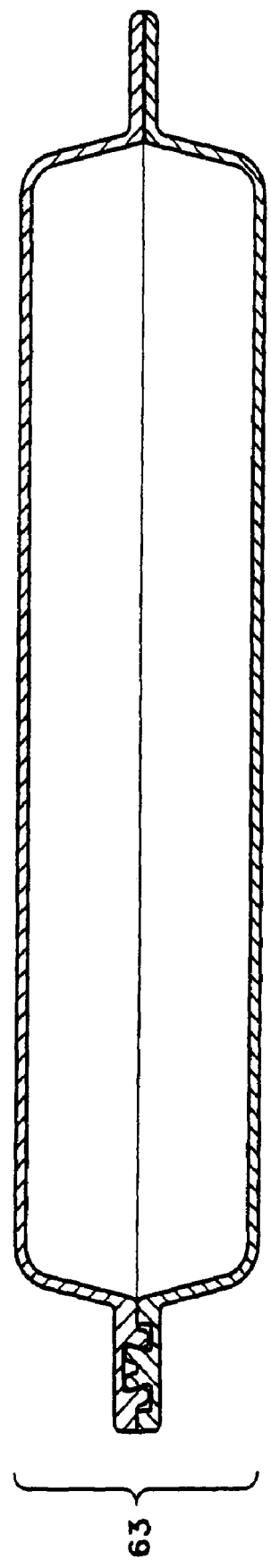
Figure 21:
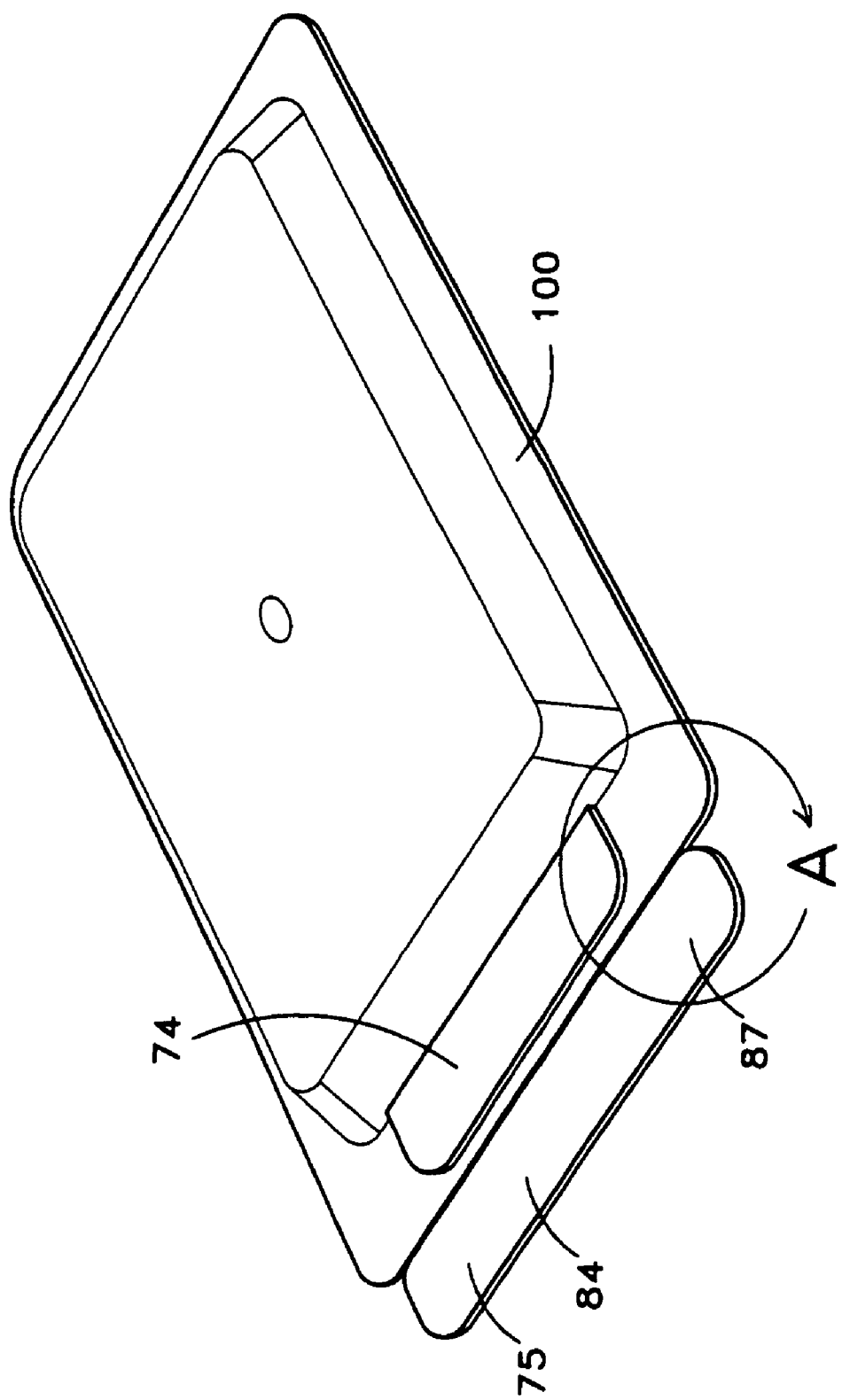
FIG. 21 shows a perspective view of a tamper resistant apparatus attached to a latchable container.
Figure 22:
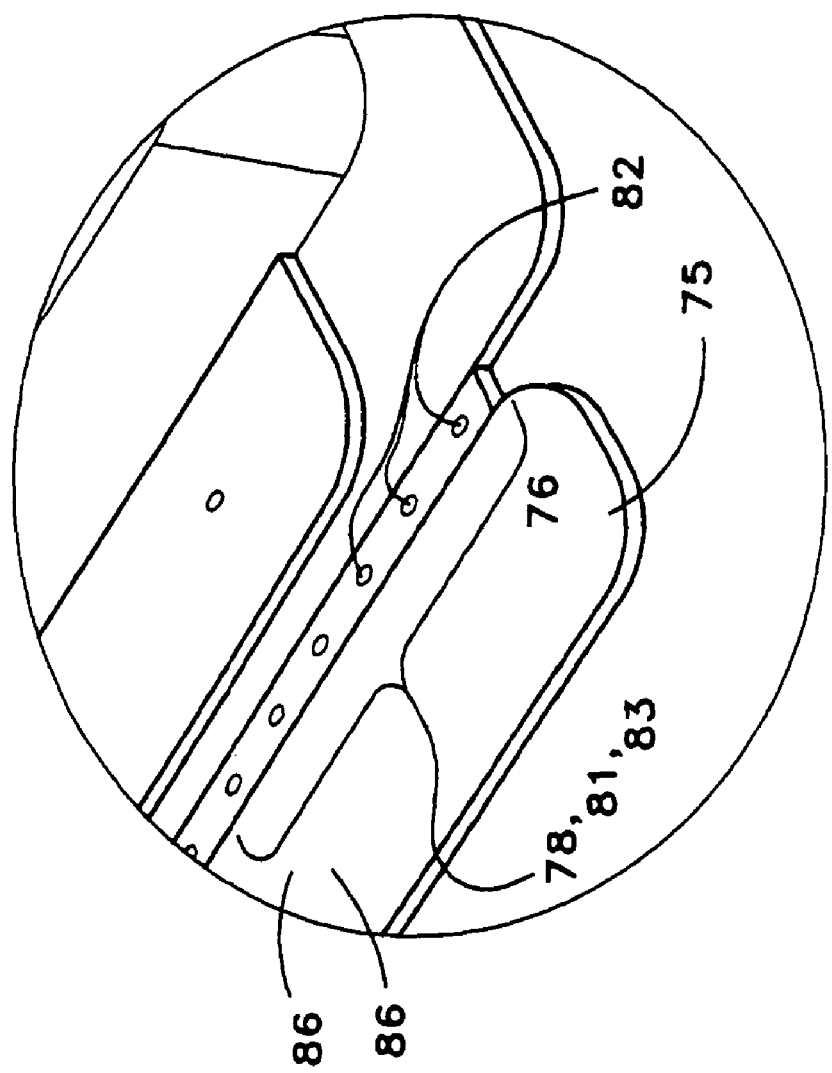
FIG. 22 shows a perspective view of a circular section A of the tamper resistant apparatus or FIG. 21.
Figure 23:
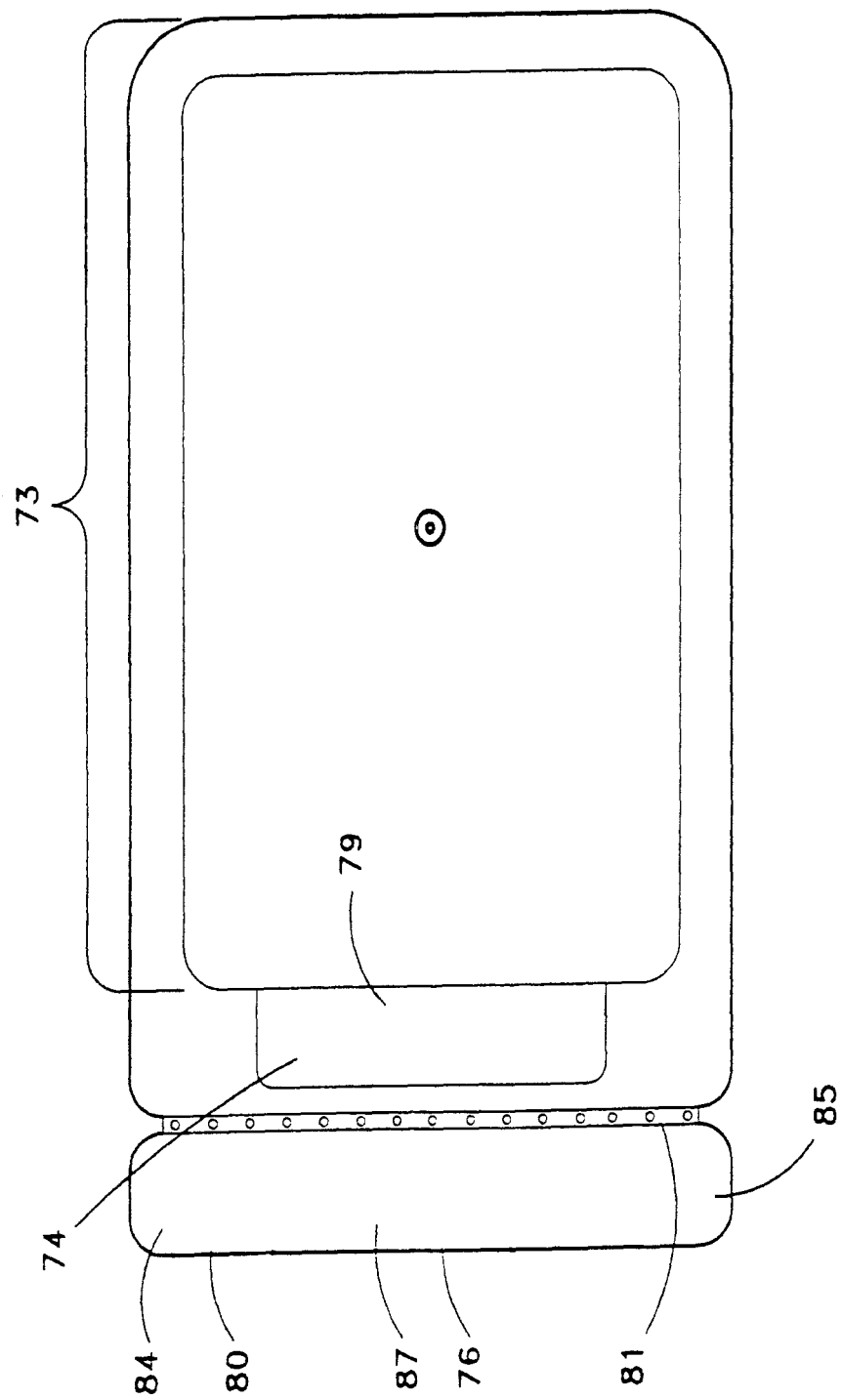
FIG. 23 shows a plan view of a latchable container having a tamper resistant apparatus.
Figure 24:
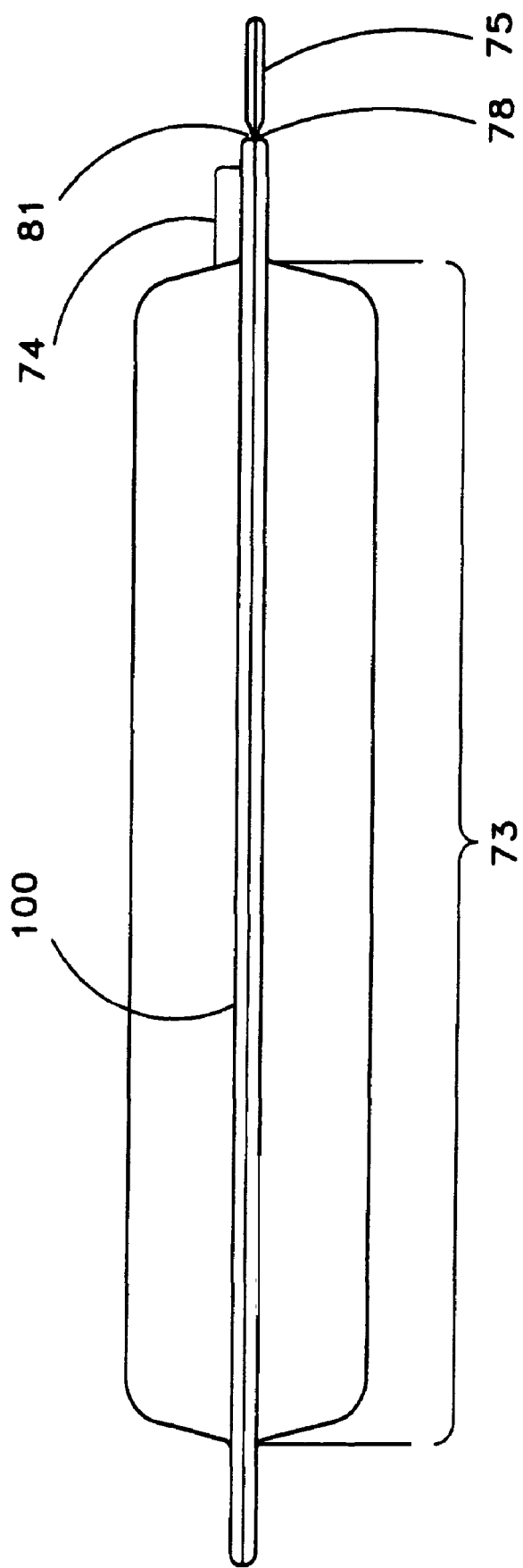
FIG. 24 shows a side view of a latchable container having a tamper resistant apparatus.
Figures 25A, 25B:
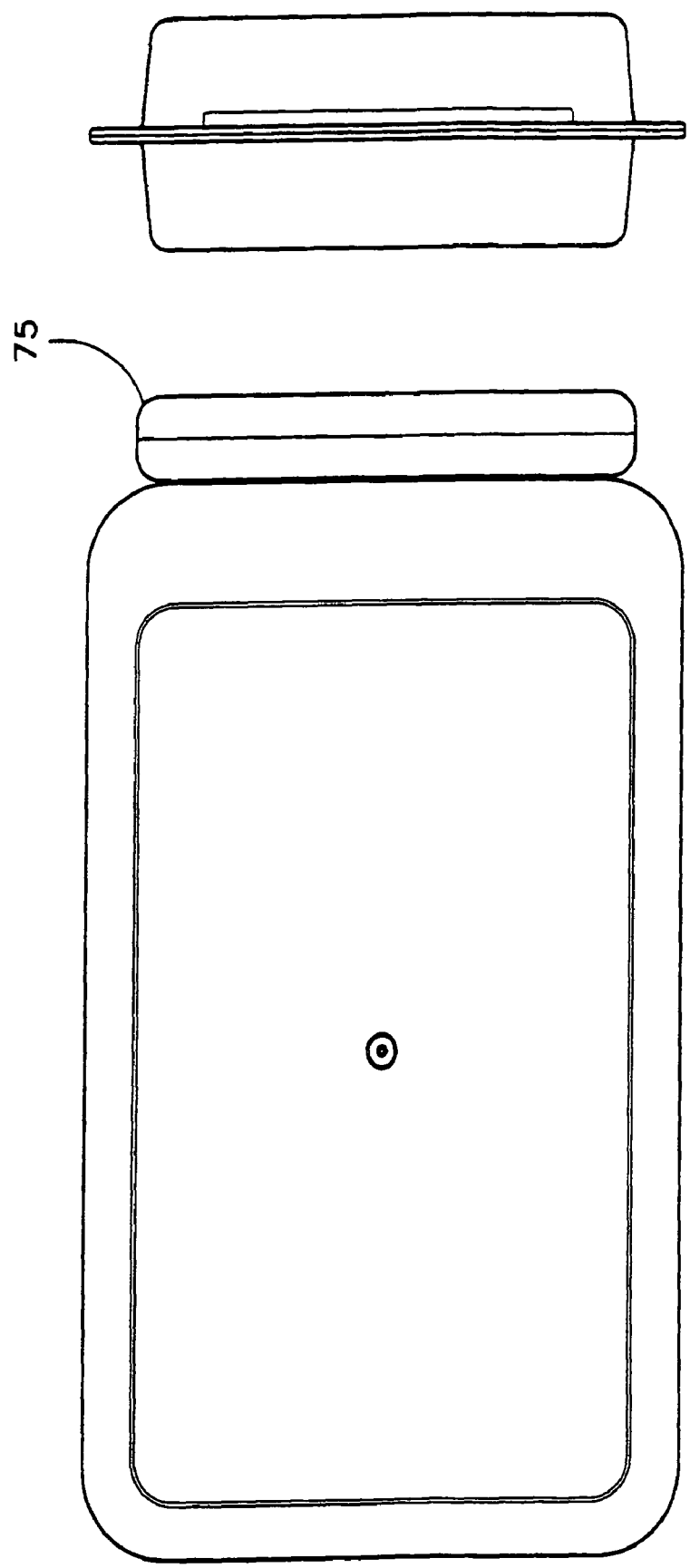
FIG. 25 shows a plan view (FIG. 25(a)) and a side view (FIG. 25(b)) of a latchable container having a tamper resistant apparatus. The side view is of an end of the functional latch as applied to of one ornamental design of a latchable container.
Figure 26:
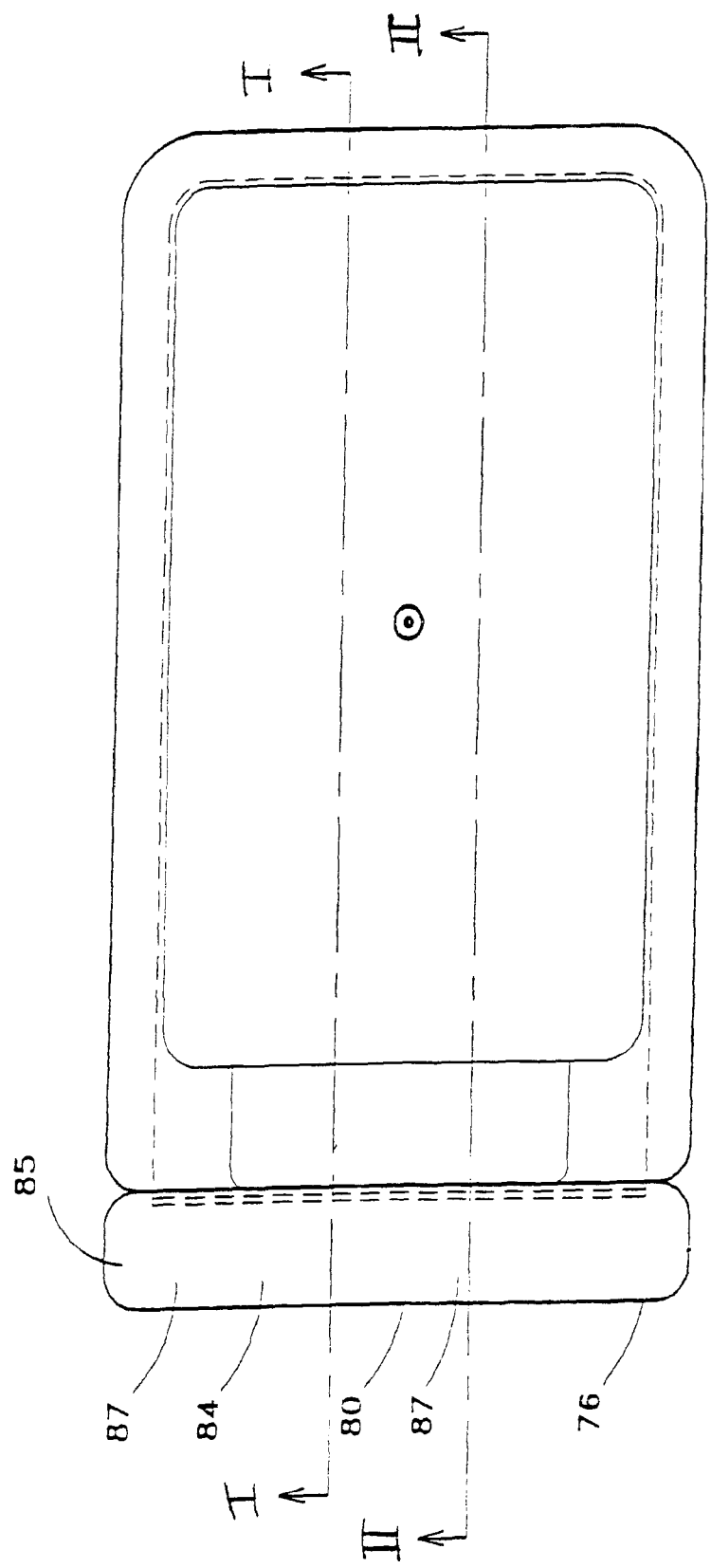
FIG. 26 shows a plan view of a latchable container having a fluid-tight seal and a tamper resistant apparatus. The fluid-tight seal may be at or beyond the dashed line.
Figure 28:
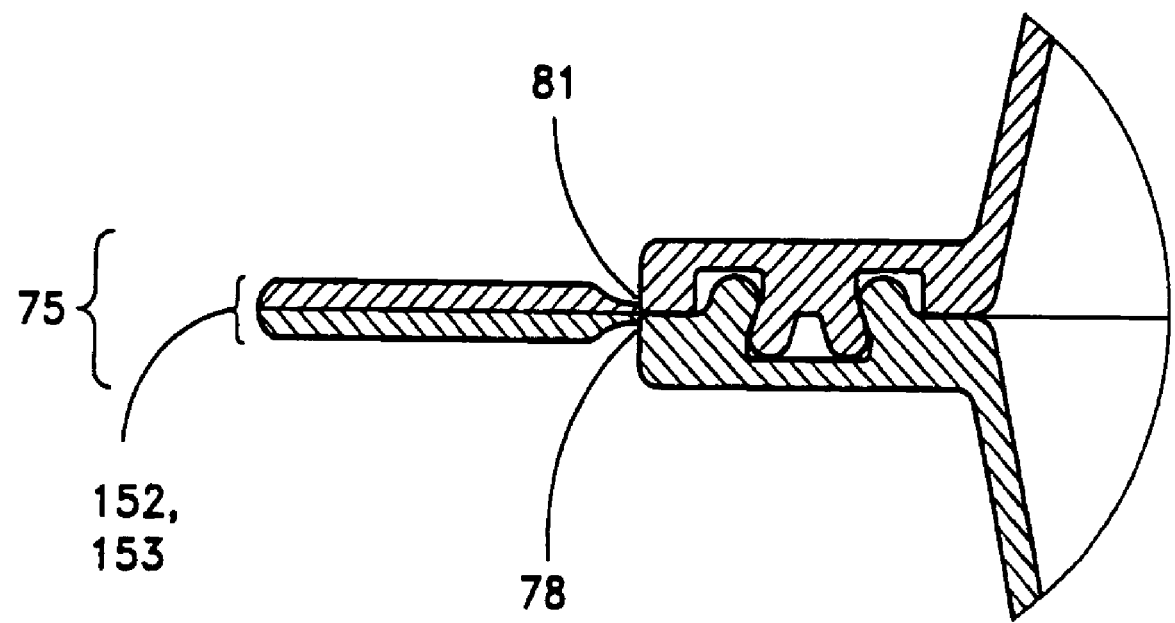
FIG. 28 shows a cross section of an engaged double divergent latch at circular section H of FIG. 27
Figure 29:
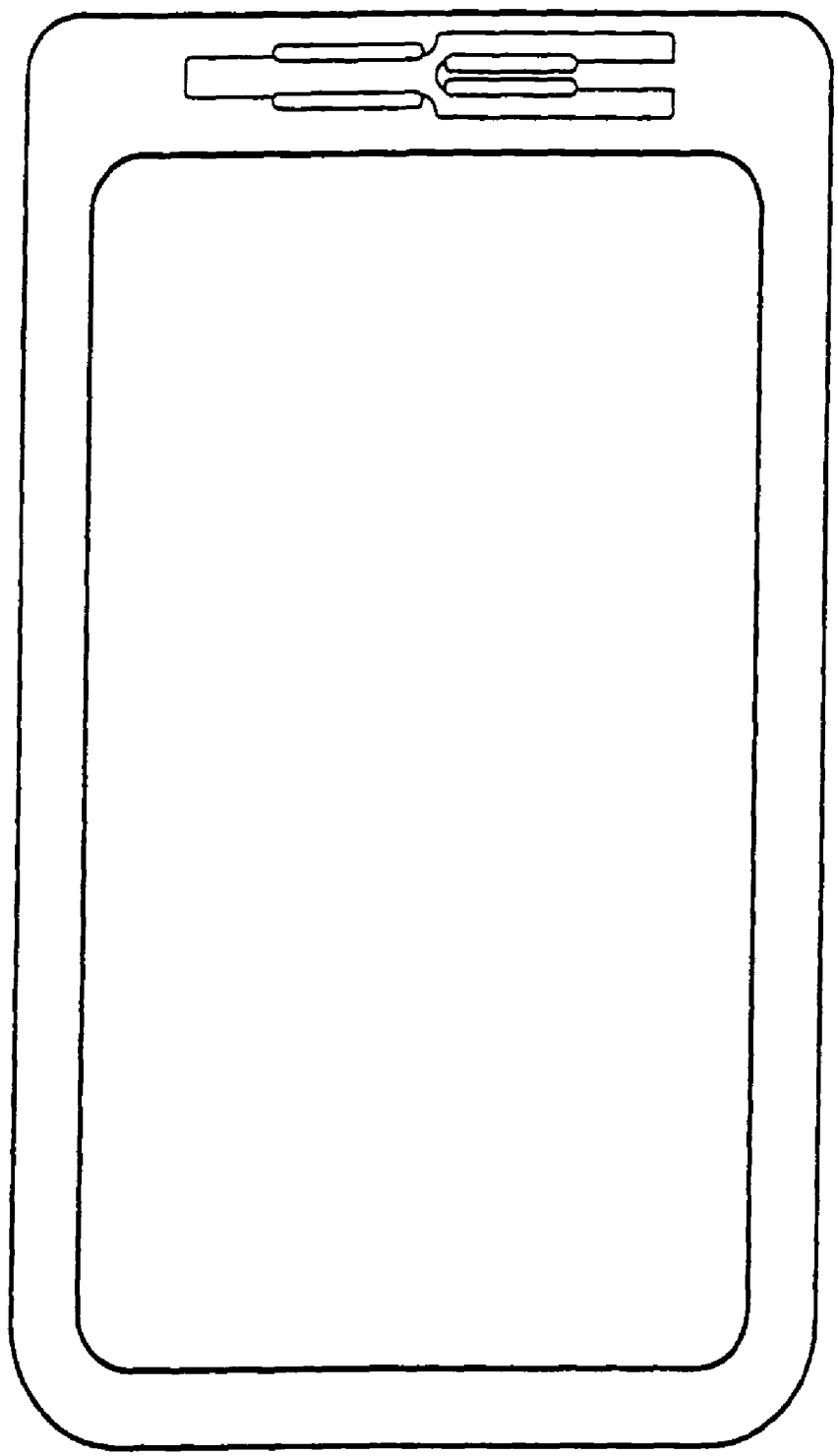
FIG. 29 shows a plan view of a rectangular latchable container half.

The two substantially identical, mutually engageable latch elements 1 and 2 configured to oppositely face each other in an assembled configuration 3 may be diagonally symmetric latch elements 11 (or two substantially identical, mutually engageable diagonally symmetric latch elements) if a certain portion of a first latch element 1 Son one side of a latch bisect axis 12 (which is an axis that is orthogonal to the latch's length axis 13 and that is located at a midpoint 14 of a latch's length axis) and located a distance X (see FIG. 10) away from the latch bisect axis 12, is identical to that portion of a second, oppositely facing latch element 16, said portion being located distance X from the latch bisect axis but on a second side of the latch bisect axis (of course, the second side is that side of the latch bisect axis that is opposite the side on which the certain portion of the first latch element is located).

The tension yieldable positive engagement element of each of the two substantially identical, mutually engageable latch elements may comprise at least one insertion element 17 and at least one receptor element 18. In at least one embodiment, the insertion element may be 17 and the receptor element may be 18, but, naturally, any part or apparatus that is the entire part that is or can be inserted into a receptor element with retentive effect upon engagement may be an insertion element and any part or apparatus that is operable or usable to receive an insertion apparatus with retentive effect upon engagement may be a receptor element. In at least one embodiment, the receptor part acts to surround the insertion element in an engagement configuration. It is important to understand that in at least one embodiment, the insertion element comprises all of the parts that are insertable or inserted into the receptor element to effect engagement (as opposed to, e.g., merely one half of the insertion element if there are two halves). The at least one insertion element may be established on a first half 19 of each of the two substantially identical, engageable latch elements and the at least one receptor element may be established on a second half 20 of each of the two substantially identical, engageable latch elements. The first half and the second half are defined as each being a unitary, or not split, or divided length separated by a latch bisect axis 12, as opposed to the case where either or both halves are split in some manner, such as, e.g., ¼ of the latch element length is a receptor element, ¼ insertion element, ¼ receptor element, ¼ insertion element (from left to right, e.g.)—see 21. Of course the split arrangement is deemed part of the inventive technology also. The at least one insertion element may be established along substantially the entire length 22 of the first half of each of the two substantially identical, engageable latch elements and the at least one receptor element may be established along substantially the entire length 23 of the second half of each of the two substantially identical, engageable latch elements. The at least one insertion element may be one insertion element and the at least one receptor element may be one receptor element.

Further, the at least one insertion element may be at least one elastically obstructive insertion element and the at least one receptor element may be at least one elastically obstructed insertion element, but in a preferred embodiment, the at least one insertion element is at least one elastically obstructed insertion element 24 and the at least one receptor element is at least one elastically obstructive receptor element 25. The term elastically obstructive may also include designs whereby the referenced element or part acts to obstruct a corresponding engaged part or element in an engaged configuration, and that the obstruction process (which may be the mode of retention) is achieved via elastic deformation; the term elastically obstructed may include designs whereby the referenced element or part is obstructed by a corresponding engaged part or element in an engaged configuration, and that the obstruction process is achieved via elastic deformation. Of course, the term obstructive (and obstructed) may include a retentive effect achieved by an obstruction that resists motion in a disengagement direction. Importantly, any insertion element that is elastically obstructed to achieve retention and any receptor element that is elastically obstructive to achieve retention is deemed within the scope of the inventive technology, although in a preferred embodiment, they appear as 24 and 25, respectively. It is important to note that an insertion element that does not elastically deform at all but that is engaged by an elastically deformable receptor element is considered an elastically obstructed insertion element and that a receptor element that does not elastically deform at all but that engages an elastically deformable insertion element is considered an elastically obstructive receptor element. However, in the preferred embodiment, each the elastically obstructed insertion element 24 and the elastically obstructive receptor element 25 is elastically deformable. It is also important to note that an elastically obstructed insertion element (or receptor element) includes insertion elements that are actually only elastically obstructed in an engaged configuration and are not elastically obstructed in a disengaged configuration. Thus, an elastically obstructed insertion element can refer to an insertion element in any configuration (engaged or disengaged) as long as the insertion element is actually elastically obstructed in an engaged configuration. Such an insertion element may also be referred to as an elastically obstructable insertion element. Of course, an elastically obstructive receptor element similarly includes a disengaged receptor element, as long as the receptor element is actually elastically obstructive in an engaged configuration.

The elastically obstructed (and elastically obstructive) feature is intended to distinguish certain embodiments from engagement apparatus where retention is achieved primarily via friction. Although friction to some extent may be operable in an elastic obstruction design as described above, any design wherein the force that opposes movement in a disengagement direction stems from an obstruction or blockage to that movement is termed elastic obstruction. The term frictive (as in a frictive engagement element) is herein defined to refer to engagement where there is no or de minimus obstruction and where friction is the primary retaining force, as in the case where, e.g., two latch elements that each comprise a positive engagement element that each itself is a dense arrangement of intermingling projections. Notable also is the fact that the term elastically obstructed and elastically obstructive apply even though the referenced insertion or receptor element is in a disengaged configuration. In accordance with this use of the term frictive as distinguished from elastically obstructive (or obstructed), the tension yieldable positive engagement element may comprise a frictive engagement element.

At least one of the at least one elastically obstructed insertion element may comprise at least one hook tongued extension 226 and at least one of the at least one elastically obstructive reception elements may comprise at least one grooved extension 227. The hooked tongued extension is 226 and the grooved extension 227 is shown in a preferred embodiment, but, in one embodiment, the hooked tongued extension should be understood to encompass any divergent lip type protrusion that extends along at least a portion of the length of a latch element and the grooved extension is deemed to encompass any oppositely divergent portion that is configured to receive the hooked tongued extension upon elastic deformation (of either or both of the corresponding parts) and accommodate (and retain) the hooked tongued extension via obstructive retention. It also may extend along at least a portion of the length of a latch element Note that in a preferred embodiment, the at least one hooked tongued extension is one hooked tongued extension 28 and the at least one grooved extension is one grooved extension 29. It is also important to note that the terminology "at least one of at least one" element is broader that the terminology "each of at least one element"—e.g., at least one of at least one element may be two of six elements, but each of at least one element is six of six elements.

At least one of the at least one elastically obstructive receptor element 25 may comprise two inwardly divergent, engagement extension elements 26 established along at least a portion of a latch element longitudinal axis 30 and parallel to one another, and adapted for reception of one of the at least one elastically obstructed insertion element 24 of an assembled-configuration-oppositely-facing, substantially identical latch element 31, and at least one of the at least one elastically obstructed insertion element 24 may comprise two outwardly divergent, engagement extension elements 32 established along at least a portion of the latch element longitudinal axis 30 and parallel to one another, and adapted for insertion within the inward confines 33 of the at least one elastically obstructive receptor element 25 of an assembled-configuration-oppositely-facing, substantially identical latch element 31. In a preferred embodiment, the two inwardly divergent, engagement extension elements are shown as element 26, but naturally any receptor element that acts to elastically obstruct a correspondable insertion element or engageable insertion element via two engagement elements that extend along at least a portion of a latch element longitudinal axis and that are each inwardly divergent (directed towards a receptor center axis 34) is deemed within the scope of the inventive technology. The latch element longitudinal axis 30 is the axis that extends along the length of the latch element 35. The two inwardly divergent engagement extension elements 26 may be adapted for reception of one of the at least one elastically obstructed insertion clement 24 of an assembled-configuration-oppositely-facing, substantially identical latch element 31 if they are able to receive one of the at least one elastically obstructed insertion element 24 of the substantially identical latch element that oppositely faces them in an assembled configuration 3. The two outwardly divergent, engagement extension elements are 32 in a preferred embodiment, but naturally any insertion element that is elastically obstructed by a correspondable receptor element via two engagement elements that extend along at least a portion of a latch element longitudinal axis and that are each outwardly divergent (directed away from an insertion center axis) is deemed within the scope of the inventive technology. Of course, the inward confines 33 of the at least one elastically obstructive receptor element 25 may be any spatial void that is partially surrounded by the two inwardly divergent, engagement extension elements 26. At least one of the at least one elastically obstructed insertion element may comprise a valley-type evacuation 36 that is located substantially between the two outwardly divergent, engagement extension elements 32. Each of the two outwardly divergent, engagement extension elements 32 may also have rounded outer edges 37. At least one of the at least one elastically obstructive receptor element may also have a flat base surface 38.

Figure 39A:
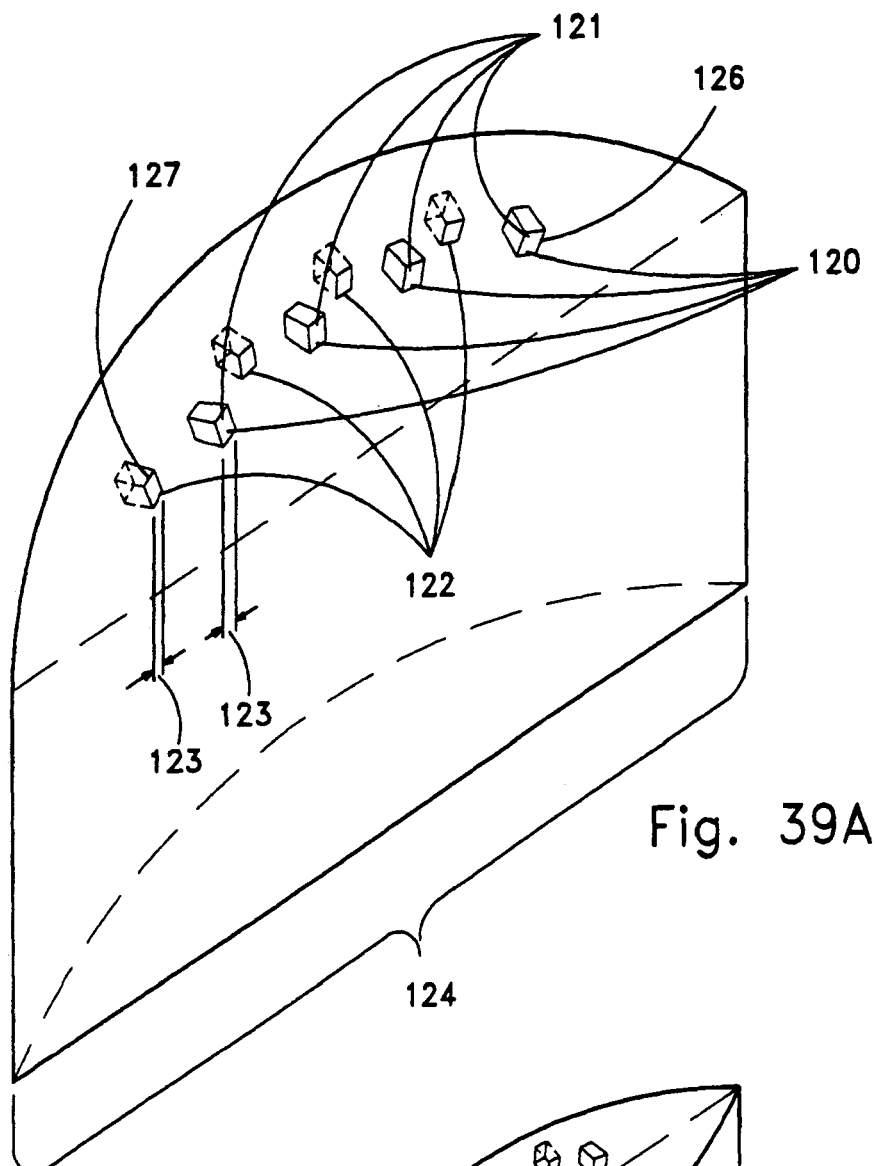
FIG. 39a shows one of two substantially identical, mutually engageable reusable latch elements that has an alternating insertion element/receptor element design.
Figure 39B:
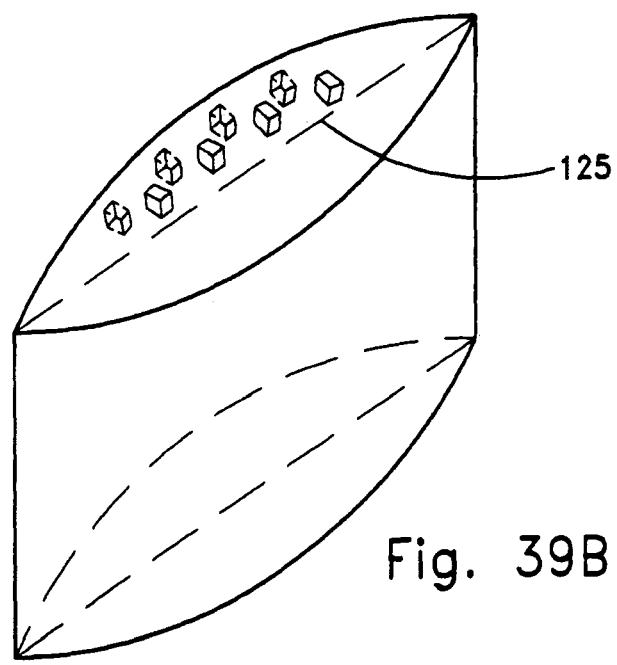
Figure 40:
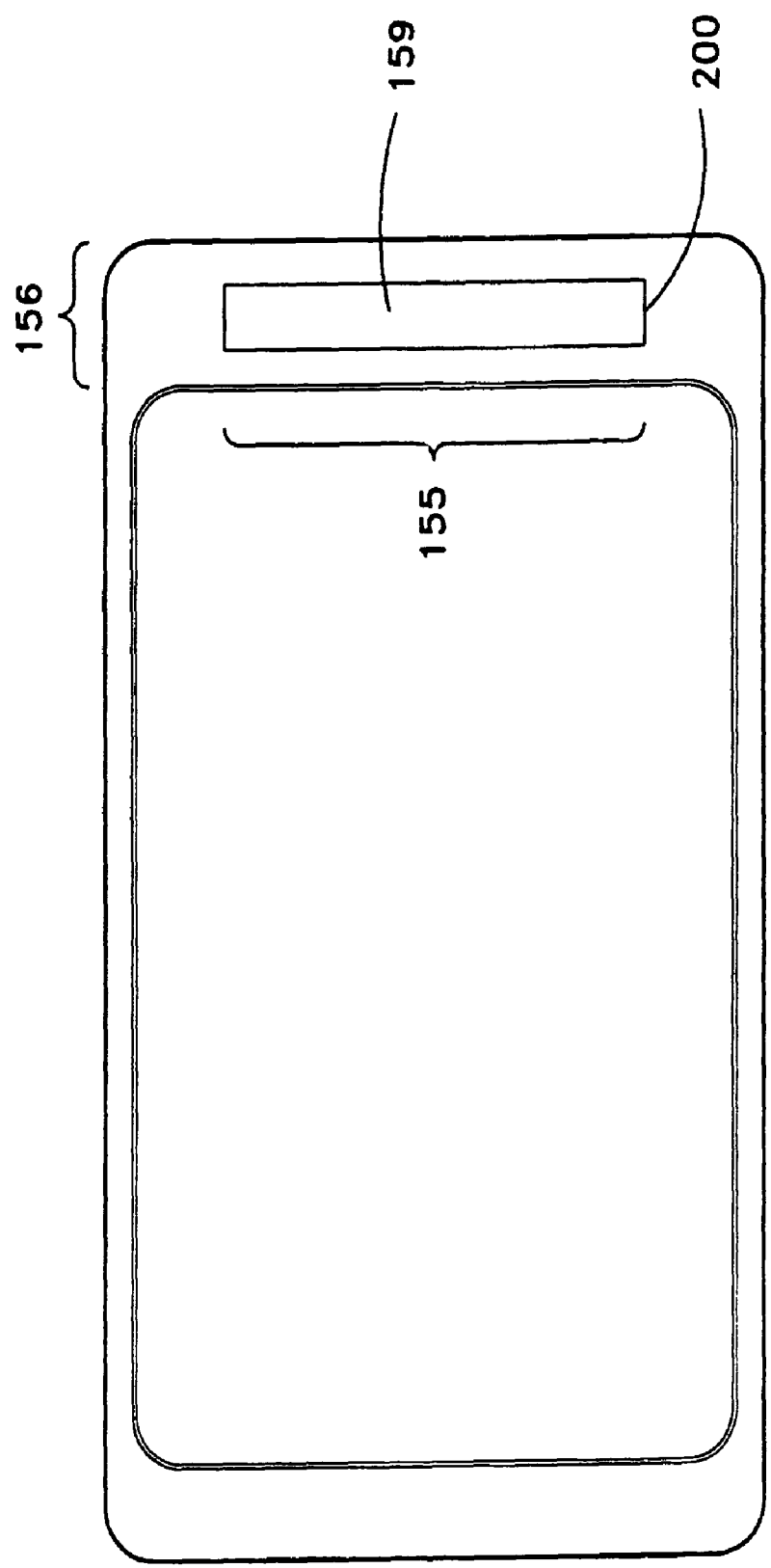
FIG. 40 shows a plan view of the interior face of a latch element having a positive engagement element that is configured to engage the separated hooked tongue insertion elements depicted in FIGS. 35, 36 and 37.

At least one embodiment of the invention may comprise a latch element that comprises a plurality of elastically obstructed insertion elements 120 and the at least one elastically obstructive receptor element may comprise a plurality of elastically obstructive receptor elements (see FIG. 39). Further, proximate or adjacent elastically obstructed insertion elements 121 may be separated by one elastically obstructive receptor element 122, and elastically obstructed insertion elements and elastically obstructive receptor elements may be approximately the same length 123. Such an arrangement may result in a design in which each latch element alternates from insertion element to receptor element to insertion element along the length of the latch element 124 (this length is co-axial with the opening axis 125). In at least one embodiment of such an alternating design, at least one (and perhaps each) of the plurality of elastically obstructed insertion elements may comprise a hook tongued extension 126 and at least one (and perhaps each) of the plurality of elastically obstructive receptor elements may comprise a grooved extension 127, but certainly other types of positive engagement elements are within the scope of the inventive technology. The latch element may be a single latch element that forms part of two substantially identical, mutually engageable reusable latch elements.

Latch elements (such as, two substantially identical, mutually engageable, molded latch elements 39) may be molded and may be termed squeeze-openable latch elements 40 (two substantially identical, mutually engageable, squeeze-openable latch elements) if they arc or are manufacture to become part of a squeeze-openable container. The latchable apparatus may also comprise a container element, which in at least one embodiment may be 41, the assembly forming a latchable container 42 (which is simply an element capable of containing contents and closeable and openable via a latch includes those elements that, even in their "closed" configuration, have an opening at which the latch is to be disposed). Of course, any part that may contain contents may serve as a container element. The container clement may be a partly sealed container element 43, which indicates that the container element to which the two substantially identical, mutually engageable latch elements 1 and 2 are responsive (as by attachment or connection, e.g.) is not sealed at some portion 44 so that at this portion, the latch element may be disposed to form a latchable container. The latchable container 42 may comprise at least one width end 45, which may include a substantially straight end 46 that is smaller in length than the length end 47 of the entire latchable container 42. Each of the two substantially identical, mutually engageable latch elements 1 and 2 may be established at at least one (or simply one) of the at least one width end 45. Further, the latchable container 42 may be a rectangular latchable container 48 (rectangular in at least one planar cross-section), and at a width end 46 of this rectangular latchable container 48 may be established the two substantially identical, mutually engageable latch elements 1 and 2. Such a rectangular latchable container 48 may be a rectangular latchable chewing gum container. Of course any other shaped container of the inventive technology may be used to contain gum. The latchable container 42 may be a squeeze-openable container 49 (as it is in the preferred embodiment) or a pull-apart-openable container 50. The two substantially identical, mutually engageable latch elements may be made from a substance selected from the group of substances consisting of: polyethylene and elvax (such as elvax 460) as but a few examples. Unlike plastic bags, the container element may be a non-film container element, and as such may have some rigidity and be able to hold its shape. The container element, and the container part, may each be symmetric about a latch bisect axis 12 (such as a design in which a portion is substantially the same on one side of the latch bisect axis as it is on the other), as may be the seal 100 that the container element may comprise, in addition to the latchable container.

Further, in at least one embodiment, the tension yieldable positive engagement elements are not coated with silicone (which, in some designs, has been used to facilitate opening and closing of the latch). This may be the result of a shaping of one or both of the positive engagement elements so that silicone is not needed to facilitate engagement and disengagement. Such shaping may be a reshaping of the positive engagement elements from prior designs (designs which did require silicone to facilitate engagement and disengagement) and may include a reduction in the distance that certain parts extend or are recessed, and/or a change in any radii of curvature of certain parts, as but a few examples. Indeed, any redesign that effects a reduction in the engaged configuration obstruction created by certain parts of the positive engagement element, such design eliminating any need for silicone to facilitate latch operation, is deemed within the scope of one potential aspect of the invention.

At least one embodiment of the invention comprises a latch apparatus that includes a container element and a low perimetrical aspect ratio, linear reusable latch 51. Importantly, a linear latch or linear reusable latch includes a latch that has a non-negligible width (in addition to those with negligible widths). Similarly, a linear latch element includes a latch that has a non-negligible width (in addition to those with negligible widths). At least one other embodiment of the invention comprises a squeeze-openable container and a low perimetrical aspect ratio reusable latch, which may comprise two low perimetrical aspect ratio reusable latch elements. The term low perimetrical aspect ratio reusable latch describes a reusable latch that has a low perimetrical aspect ratio, which indicates that a certain ratio—a ratio of a dimension of the latch (located at a container opening) to the larger of the container's two characteristic perimeters—is less than 0.20. For explanatory purposes, every container is defined to have two characteristic perimeters—one major and one minor. The major perimeter is related to a container length, and may be that perimeter (substantially of the outer container surface) that is observed to lie within a plane that contains a container's length dimension. The length dimension may simply be the largest of those straight line lengths that pass through the container volume. Either both or one of its ends may terminate at the surface of the container volume (or of the container surface if there is a container surface (instead of a container opening) proximate of the surface of the container volume). It is important to understand that this includes those lengths that terminate (at one or two ends) at a container opening (in addition to including those lengths that terminate at a container surface). The major perimeter may also be conceptualized as that perimeter that lies within a plane that contains what is intuitively a container length. Note that the major perimeter is defined to be determinable from a plane that contains a container length and that intersects a container opening (and thus has at at least one portion a "blank" area at which there is no container surface intersection) in addition to those planes that only intersect a container surface to form a closed curve (as used here, curve can be comprised of straight lines in addition to curves). In such a case where the intersected surface does not form a closed figure, the perimeter is deemed to include a length that traverses the container opening.

The minor perimeter is that perimeter (substantially of the outer container surface) that is observed to intersect a plane that contains a container's width dimension, which is deemed orthogonal to the container's length dimension. Note also that every container is deemed to have a length and a width (the container need not be square in any single planar cross-section to have a length and a width dimension). Further, even if there is no longest straight line dimension (because all characteristic dimensions are the same length, as with a sphere) there is still a major and a minor axis because one is arbitrarily deemed major and the other minor.

The major perimeter is the dimension that is used in the denominator in determining the perimetrical aspect ratio. The numerator (which is a dimension of the opening) is typically the length of the latch (e.g., linear latch length 52), although it may be any dimension (such as a diameter or arc length, e.g.) that acts to define the longer of two characteristic latch dimensions in some manner. Essentially, the term low perimetrical aspect ratio, reusable latch is intended to define a latch that has a defining dimension such as a length that, when divided by the major perimeter of the container, is low (meaning less than 0.20). The adjective linear may indicate that the latch is straight or substantially straight (although a slightly curved arc is within the definition of linear). Other more specific values for the low perimetrical aspect ratio include less than 0.15, less than 0.1, less than 0.05, and less than 0.01, as but a few examples The term low perimetrical aspect ratio may be applied to, inter alia, a reusable latch, and a linear reusable latch (thus, a low perimetrical aspect ratio reusable latch and a low perimetrical aspect ratio, linear reusable latch). The two substantially identical, mutually engageable latch elements may form at least a part of a low perimetrical aspect ratio reusable latch (or a low perimetrical aspect ratio latch) which may also be linear. Note that a perimetrical aspect ratio determined from a linear latch length includes a ratio determined from a fraction whose numerator is a linear latch length 52.

At least one embodiment of the latch apparatus and or of the tamper-resistant apparatus may further comprise a continuous fluid blocking seal 130 or continuous fluid tight seal that surrounds an enclosure formed by the latchable container such as a squeeze-openable latchable container, as but one example. A portion of the continuous fluid blocking seal 130 may be established as part of the unopened assurance element 75, and at least some of the portion of the continuous fluid blocking seal established as part of the unopened assurance element 180 may extend distally of the strength compromised element 81. The term "distally of the strength compromised element" may refer to further from the center of the enclosure formed by the container element than the strength compromised element, and includes the case where only the majority of the continuous fluid blocking seal 130 extends beyond the strength compromised element. Any seal that operates to block or prevent the flow of at least some type of fluid (even if only very mildly pressurized) is a fluid blocking seal. The fluid may be liquid such as water or gas such as air, as but two examples. Continuous seal may refer to the fact that in at least one embodiment, the seal travels or is positioned or established around an entire perimeter of the latchable container. The seal may also be in the same plane as the latch. As the continuous fluid blocking seal 130 may be established as part of the unopened assurance element 75, and as at least a portion of the continuous fluid blocking seal 130 may extend distally of the strength compromised element, the seal may be broken upon removal of the unopened assurance element or of the manual force transfer element at the strength compromised element. Analogous methods may comprise the steps of establishing a continuous seal that surrounds an enclosure formed by the container element, establishing the continuous seal as part of the unopened assurance element, and extending at least a portion of the continuous seal distally of the strength compromised element.

At least one embodiment of the invention encompasses a latch apparatus that includes, inter alia, only one latch element 60. This latch element may comprise a tension yieldable, positive engagement element 4, wherein a first portion 53 of this tension yieldable positive engagement element 4 that is located on a first side 55 of a latch bisect axis 12 is shaped to be rotationally engageable with a second portion 54 of the tension yieldable positive engagement element 4 that is located on a second side 56 of the latch bisect axis 12, and wherein the latch element is configured to engage an assembled-configuration-oppositely-facing, substantially identical latch element 31. Note that the latch bisect axis is simply that axis that bisects (halves) the latch element and that is orthogonal to a latch element longitudinal axis 30. The phrase "a first portion 53 of said tension yieldable positive engagement element that is located on a first side 55 of a latch bisect axis 12 is shaped to be rotationally engageable with a second portion 54 of said tension yieldable positive engagement element 4 that is located on a second side 56 of the latch bisect axis 12" indicates that each portion of the tension yieldable positive engagement element 4 that is located on a first side 55 of a latch bisect axis 12 and located distance X from the latch bisect axis 12 is shaped to be engageable with a portion of the same tension yieldable positive engagement element 4 that is located on the second (the other) side 56 of the latch bisect axis and located a distance X from the latch bisect axis. It is important to note that the term "shaped to be" enables the limitation to be met by a tension yieldable positive engagement element that because for example, of the stiffness of the engagement element or of the latch element that comprises it, or because the resultant bending of the latch element and positive engagement element is not an intended use of the apparatus, does not have portions of the tension yieldable engagement element on one side of the latch bisect axis that are actually engageable with portions on the other side of the latch bisect axis. The term "shaped to be" renders such designs as meeting the limitation, notwithstanding their inability to actually engage (or the inappropriateness of the bending concomitant with such engagement). Indeed, the term "shaped to be" renders the rotationally engageable limitation as in some designs, primarily conceptual in nature (but nonetheless applicable). The term "shaped to be rotationally engageable" may thus be viewed as requiring that the positive engagement element, when conceptually bent at the latch bisect axis so that a portion of the positive engagement element faces another portion of the positive engagement element, is engageable with itself.

At least one embodiment of the latch apparatus may comprise a single latch element 60, and a container part 61 to which the latch element 60 is responsive and to form a latchable container part 62. The container part 61, as opposed to the container element 41, is defined as a part that, when mated with another container part (which may or may not be the same size and shape), forms a container (such as the container element 41). Note that although a container part 61 may physically be capable of containing some contents (for example, as does an open-faced tray), it is not deemed within the definition of a container (or container element 41), which is defined as not having one of its largest sides as an open end. The latchable container part, which may be 62 in one embodiment of the invention, may be any container part that has attached or connected (even if by molding or any means) a latch element 60 and that, when sealed to or somehow attached to another latchable container part 62 (which may or may not be the same size and shape) forms a latchable container 63. The latchable container part 62 may comprise a squeeze-openable container part 64 or a pull-apart-openable container part 65. The latchable container part 62 may have at least one width end 66, at which the latch element 60 may be established. The container part 62 may be a container half 68 and the latchable container part 62 may be a latchable container half 67, wherein a half is substantially identical to what may be termed a corresponding half. The latchable container half 67 may comprise a squeeze-openable container half 69 or a pull-apart-openable container half 70. Of course, if the squeeze-openable container half is made from a material other than film, the squeeze-openable container half may be a non-film squeeze-openable container half (or a non-film squeeze-openable latchable container half). Such latchable container half may be a rectangular latchable container half 71 (such as a rectangular latchable chewing gum container half that may be combined or sealed with another rectangular latchable chewing gum container half to form a rectangular latchable chewing gum container), having a width end 72 at which the latch element is established. The latch element, either alone or in addition to the container part, may be made from polyethylene or elvax (e.g. elvax 460) as but two examples. The container part may be, e.g., a non-film container part. Further, the container part may be symmetric about a latch bisect axis 12.

At least one embodiment of the inventive technology (what may be referred to as the divided hooked tongue insertion elements design) may comprise a first latch element 152 that comprises a first positive engagement element 151 that comprises a plurality of elastically obstructed insertion elements 150. This latch element may comprise a squeeze-openable latch element. Further, a majority (more than fifty per-cent) of the elastically obstructed insertion elements (or each) may each comprise a hook tongued extension 226. At least one embodiment may further comprise a container part to form a latchable container part, as well as an unopened assurance element part 226 that may comprise an unopened condition indicator element part 153. The latchable container part may comprise a latchable container part that is symmetric about a latch bisect axis. The container part may comprises a container half. At least one embodiment may further comprise a second latch element 155 that comprises a second positive engagement element 200 (termed second in order to distinguish from the first positive engagement element), wherein the second positive engagement element may comprise at most fifty elastically obstructive receptor elements, and wherein each of a majority (each of more than fifty per-cent)

of the elastically obstructive receptor element may be adapted to receive at least one of the plurality of elastically obstructed insertion elements of the first latch element. Further, the second latch element 156 may be correspondable with the first latch element in an installed configuration to form a latch. Adjacent elastically obstructed insertion elements 157 may be separated by a substantially equally lengthed gap 158.

In at least one embodiment, the at most fifty elastically obstructive receptor elements may comprise one elastically obstructive receptor element 159 that is adapted to receive all of the elastically obstructed insertion elements 150 of the first latch element. If a one elastically obstructive receptor element is able to receive all of the elastically obstructed insertion element of the first latch element, then it is deemed adapted to receive them. The latch apparatus may further comprise a container element to which the latch is responsive to form a latchable container. It may also further comprise an unopened assurance element that itself comprises an unopened condition indicator element. The container element may comprise a non-film container element. The unopened assurance element may further comprise a separation facilitation element that comprises a strength compromised element. This (as well as other) latch apparatus may further comprise a continuous fluid blocking seal 130 that surrounds an enclosure formed by the container element, and that is established as part of the unopened assurance element, wherein at least a portion 180 of the continuous fluid blocking seal 130 extends distally of the strength compromised element. The at least a portion 180 of the continuous fluid blocking seal may be a substantially straight portion 181.

Another aspect of the inventive technology is a tamper-resistant apparatus or a factory closure integrity assurance apparatus that may comprise a squeeze-openable container element 73, a reusable latch 74 to which said squeeze-openable container element is responsive and an unopened assurance element 75 to which said reusable latch is responsive, wherein the unopened assurance element may comprise an unopened condition indicator element 76. The unopened assurance element is any element such as a part that is usable in some fashion so that a user or other individual may assure that a container (such as a squeeze-openable container) is unopened (e.g., as it left from the factory that initially closed the container opening). Note that a squeeze openable container is deemed openable even if it is not openable when it has an unopened assurance element on it. One type of squeeze-openable container that may be of particular importance relative to the factory closure integrity assurance apparatus is a squeeze-openable chewing gum container (which is, of course, a squeeze-openable container that is designed to contain chewing gum). The unopened assurance element may comprise an unopened condition indicator element 76 which acts to indicate in some manner (such as visually, in which case the unopened condition indicator element 76 would be a visual unopened condition indicator element 77) whether the container is in its unopened condition. The unopened assurance element 75 may comprise a separation facilitation element 78 to which the unopened condition indicator element 75 is responsive. The separation facilitation element 78 is any element such as a part that acts to facilitate the separation of the unopened condition indicator element 76 from the element to which it may in some manner be connected or attached such as the squeeze-openable container element or the reusable latch. Of course, if the non-film squeeze-openable container element l(or instead, the squeeze-openable latchable container) is made from a material other than film, then it may be a non-film squeeze-openable container element (or non-film squeeze-openable latchable container).

The reusable latch may be a linear reusable latch 79 (meaning it is not circular or near circular, although it may exhibit a slight curve, and certainly may be straight) and the unopened assurance element may comprise a linear unopened assurance element 80. The separation facilitation element may comprise a strength compromised element 81, which in a preferred embodiment may comprise perforations 82, but certainly any manner of compromising strength in order to enhance the removal of the unopened condition indicator element 76 (with, for example, simply a section that is thinner than surrounding parts on either side, such as a section having a V-notch cross-section at one surface. The strength compromised element may be a substantially straight strength compromised element 83. The unopened condition indicator element 76 may be a visual indicator element 84; the visual indicator element may comprise a tab 85. It may be made from polyethylene or elvax, for example; it may be a solid indicator element 86 (e.g., substantially not have any spatial voids between its outer surfaces and edges), or instead it may comprise two layers, e.g. The unopened condition indicator may also comprise a graspable, manual force transfer element 87, which is any element such as a part that may be manually grasped by a user of the container, e.g., and which serves to transfer the force imparted by the user (in removing the unopened condition indicator element, e.g.) to a strength compromised element 81. Note that only part of the graspable, manual force transfer element need be graspable. The reusable latch may comprise a hooked tongue and groove reusable latch 88, or it may comprise a double divergent reusable latch 89, as but a few examples. Further, any of the claims related to the factory closure integrity assurance apparatus may also be used to further limit the inventive technology associated with the manufacture facilitating latch apparatus. An unopened assurance element part 152 may refer to a portion of an unopened assurance element such as a side or half that may be attached or connected in some fashion so as to form an unopened assurance element 75. A non-film container part is a container part that is non-film. Associated methods (e.g., a tamper-resistant containment method) are also deemed within the scope of the inventive technology.

Yet another embodiment of a latchable container may comprise a container element 41, a low perimetrical aspect ratio linear reusable latch 51 to which said container element 41 is responsive and an unopened assurance element 51 to which the linear reusable latch 51 is responsive, wherein the unopened assurance element 75 may comprise an unopened condition indicator element 76. The low perimetrical aspect ratio, linear reusable latch 51 is a type of non-circular reusable latch 51 (although it may be somewhat curved and certainly may be straight) that has a low perimetrical aspect ratio. Again, the unopened assurance element is any element such as a part that is usable in some fashion so that a user or other individual may assure that a container (such as a squeeze-openable container, e.g.) is unopened (e.g., as it left from the factory that initially closed the container opening). It may comprise an unopened condition indicator element 76 which acts to indicate in some manner whether the container is in its unopened condition. The unopened assurance element may comprise a linear unopened assurance element, meaning that the unopened assurance element may be non-circular, although it may be somewhat curved and certainly may be straight. Associated methods (e.g., a latchable containment method, or a tamper-resistant containment method) are also deemed within the scope of the inventive technology). At least one other embodiment comprises a squeeze-openable container element, a low perimetrical aspect ratio reusable latch, and an unopened assurance element that comprises an unopened condition indicator element. It is important to note that this aspect of the invention, as well as other embodiments of the invention, can incorporate a squeeze-openable container.

As can be easily understood from the foregoing, the basic concepts of the present invention may be embodied in a variety of ways. It involves both latching and product user safety enhancement techniques as well as apparatus to accomplish the appropriate latching and safety enhancement. In this application, the latching and safety enhancement techniques are disclosed as part of the results shown to be achieved by the various apparatus described and as steps which are inherent to utilization. They are simply the natural result of utilizing the apparatus as intended and described. In addition, while some apparatus are disclosed, it should be understood that these not only accomplish certain methods but also can be varied in a number of ways. Importantly, as to all of the foregoing, all of these facets should be understood to be encompassed by this disclosure.

The discussion included in this non-provisional application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in apparatus-oriented terminology, each element of the apparatus implicitly performs a function. Apparatus claims may not only be included for the apparatus described, but also method or process claims may be included to address the functions the invention and each element performs. Neither the description nor the terminology is intended to limit the scope of the claims.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon by the claims in this non-provisional patent application. It should be understood that such language changes and broad claiming is accomplished in this non-provisional filing. This patent application is designed to yield a patent covering numerous aspects of the invention both independently and as an overall system.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates.

Regarding this last aspect, as but one example, the disclosure of a "latch" should be understood to encompass disclosure of the act of "latching"—whether explicitly discussed or not—and, conversely, were there effectively disclosure of the act of "latching", such a disclosure should be understood to encompass disclosure of a "latch" and even a "means for latching" Such changes and alternative terms are to be understood to be explicitly included in the description.

Any acts of law, statutes, regulations, or rules mentioned in this application for patent; or patents, publications, or other references mentioned in this application for patent arc hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to claim at least: i) each of the latching and safety enhancement apparatus as herein disclosed and described, ii) the related methods disclosed and described, iii) similar, equivalent, and even implicit variations of each of these apparatus and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, and ix) methods and apparatuses substantially as described hereinbefore and with reference to any of the accompanying examples, x) the various combinations and permutations of each of the elements disclosed, and xi) each potentially dependent claim or concept as a dependency on each and every one of the independent claims or concepts presented. In this regard it should be understood that for practical reasons and so as to avoid adding potentially hundreds of claims, the applicant may eventually present claims with initial dependencies only. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

The claims set forth in this specification by are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The invention claimed is:

1. A tamper-resistant latch apparatus comprising:

two substantially identical, mutually engageable, squeeze-openable latch elements configured to oppositely face each other in an assembled configuration, each comprising a tension yieldable, positive engagement element; and a partly sealed container element having at least one opening to which said two substantially identical, mutually engageable, squeeze-openable latch elements are responsive to form a squeeze- openable latch able container, wherein said partly sealed container element comprises a non-film container element, wherein said tension yieldable positive engagement element of each of said two substantially identical, mutually engageable, squeeze-openable latch elements comprises one elastically obstructed insertion element established on a first half of each said two substantially identical, mutually engageable, squeeze-openable latch elements and one elastically obstructed receptor element established on a second half of each said two substantially identical, mutually engageable, squeeze-openable latch elements, wherein said one elastically obstructive receptor element comprises two inwardly divergent, engagement extension elements established along at least a portion of a latch element longitudinal axis and parallel to one another and adapted for reception of one elastically obstructed insertion element of an assembled-configuration-oppositely-facing, substantially identical latch element, wherein said one elastically obstructed insertion element comprises two outwardly divergent, engagement extension elements established along at least a portion of said latch element longitudinal axis and parallel to one another and adapted for insertion within the inward confines of one elastically obstructive receptor element of an assembled-configuration-oppositely-facing, substantially identical latch element, wherein said one elastically obstructed insertion element comprises a valley-type evacuation substantially between said two outwardly divergent, engagement extension elements, wherein each of said two outwardly divergent, engagement extension elements comprises rounded outer edges, and a linear unopened assurance element to which said latch apparatus is responsive, wherein said linear unopened assurance element comprises an unopened condition indicator element, wherein said linear unopened assurance element comprises a separation facilitation element to which said unopened condition indicator element is responsive, wherein said separation facilitation element comprises a strength compromised element, wherein said unopened condition indicator element comprises a visual indicator element, wherein said visual indicator element comprises a tab, and wherein said unopened condition indicator element comprises a graspable, manual force transfer element.

2. The tamper-resistant latch apparatus of claim 1, further comprising a continuous fluid blocking seal that surrounds an enclosure formed by said squeeze-openable latch able container, wherein a portion of said continuous fluid blocking seal is established as part of said linear unopened assurance element, wherein at least some of said portion of said continuous fluid blocking seal extends distally of said strength compromised element, and wherein said at least a portion of said continuous fluid blocking seal is a substantially straight portion.

3. A tamper-resistant latch apparatus comprising:

a squeeze-openable latch element that comprises a tension yieldable, positive engagement element, wherein a first portion of said tension yieldable positive engagement element that is located on a first side of a latch bisect axis is shaped to be rotationally engageable with a second portion of said tension yieldable positive engagement element that is located on a second side of said latch bisect axis, wherein said squeeze-openable latch element is configured to engage an assembled- configuration-oppositely-facing, substantially identical, squeeze-openable latch element, and wherein said tension yieldable positive engagement element comprises one elastically obstructed insertion element established on a first half of said, squeeze-openable latch element and one elastically obstructive receptor element established on a second half of said, squeeze-openable latch element; and a non-film squeeze-openable container half to which said latch element is responsive to form a non-film squeeze-openable latch able container half, wherein said one elastically obstructive receptor element comprises two inwardly divergent, engagement extension elements established along at least a portion of a latch element longitudinal axis and parallel to one another and adapted for reception of said one elastically obstructed insertion element of an assembled-configuration-oppositely-facing, substantially identical latch element, and wherein said one elastically obstructed insertion element comprises two outwardly divergent, engagement extension elements established along at least a portion of a latch element longitudinal axis and parallel to one another and adapted for insertion within the inward confines of said one elastically obstructive receptor element of an assembled-configuration-oppositely-facing, substantially identical latch element, wherein said one elastically obstructed insertion element comprises a valley-type evacuation substantially between said two outwardly divergent, engagement extension elements, and wherein each of said two outwardly divergent, engagement extension elements comprises rounded edges, and a linear unopened assurance element to which said latch apparatus is responsive, wherein said linear unopened assurance element comprises an unopened condition indicator element, wherein said linear unopened assurance element comprises a separation facilitation element to which said unopened condition indicator element is responsive, wherein said separation facilitation element comprises a strength compromised element, wherein said unopened condition indicator element comprises a visual indicator element, wherein said visual indicator element comprises a tab, and wherein said unopened condition indicator element comprises a graspable, manual force transfer element.

4. The tamper-resistant latch apparatus of claim 3, further comprising a continuous fluid blocking seal that surrounds an enclosure formed by two of said non-film squeeze-openable latch able container halves, wherein a portion of said continuous fluid blocking seal is established as part of said linear unopened assurance element, wherein at least some of said portion of said continuous fluid blocking seal extends distally of said strength compromised element, and wherein said at least a portion of said continuous fluid blocking seal is a substantially straight portion.

5. A latch apparatus comprising two substantially identical, mutually engageable, squeeze-openable latch elements configured to oppositely face each other in an assembled configuration, each latch element comprising a tension yieldable, positive engagement element;

wherein said tension yieldable, positive engagement element comprises at least one insertion element and at least one receptor element;

wherein said at least one insertion element comprises at least one elastically obstructive insertion element and said at least one receptor element comprises at least one elastically obstructive receptor element;

wherein at least one of said at least one elastically obstructive receptor element comprises two inwardly divergent, engagement extension elements established along at least a portion of a latch element longitudinal axis and parallel to one another and adapted for reception of one of said at least one elastically obstructed insertion element of an assembled-configuration-oppositely-facing, substantially identical latch element, and wherein at least one of said at least one elastically obstructed insertion element comprises two outwardly divergent, engagement extension elements established along at least a portion of said latch element longitudinal axis and parallel to one another and adapted for insertion within the inward confines of said at least one elastically obstructive receptor element of an assembled- configuration-oppositely-facing, substantially identical latch element, and a linear unopened assurance element to which said latch apparatus is responsive, wherein said linear unopened assurance element comprises an unopened condition indicator element, wherein said linear unopened assurance element comprises a separation facilitation element to which said unopened condition indicator element is responsive, wherein said separation facilitation element comprises a strength compromised element, wherein said unopened condition indicator element comprises a visual indicator element, wherein said visual indicator element comprises a tab, and wherein said unopened condition indicator element comprises a graspable, manual force transfer element.

6. The latch apparatus of claim 5, wherein said at least one of said at least one elastically obstructive receptor element comprises one elastically obstructive receptor element and said at least one of said at least one elastically obstructed insertion element comprises one elastically obstructed insertion element.

7. The latch apparatus of claim 5, wherein said at least one of said at least one elastically obstructed insertion element comprises a valley-type evacuation substantially between said two outwardly divergent, engagement extension elements.

8. The latch apparatus of claim 5, wherein each of said two outwardly divergent, engagement extension elements comprises rounded outer edges.

9. The latch apparatus of claim 5, wherein said at least one of said at least one elastically obstructive receptor element further comprises a flat base surface.

10. The latch apparatus of claim 5, wherein said tension yieldable positive engagement element comprises a frictional engagement element.

* * * * *

UNITED STATES PATENT AND TRADEMARK OFFICE
CERTIFICATE OF CORRECTION

PATENT NO. : 7,819,279 B2
APPLICATION NO. : 11/588673
DATED : October 26, 2010
INVENTOR(S) : Roderick E. Galland and Hossein Monajjem It is certified that error appears in the above-identified patent and that said Letters Patent is hereby corrected as shown below:

On the cover page of the patent, insert the following:

--(62) Division of application No. 10/219,364, filed Aug. 14, 2002, now Pat. No. 7,204,388 B2.--

Signed and Sealed this
Twenty-sixth Day of March, 2013

Teresa Stanek Rea
*Acting Director of the United States Patent and Trademark Office*